US005602972A

United States Patent [19]

Hada et al.

[11] Patent Number: 5,602,972
[45] Date of Patent: Feb. 11, 1997

[54] PIXEL AND DATA FORMAT CONVERSION PROCESSOR FOR GRAVURE

[75] Inventors: Kohji Hada; Takumi Yoshida, both of Kyoto, Japan

[73] Assignee: Dainippon Screen Manufacturing Co., Ltd., Japan

[21] Appl. No.: 196,631

[22] Filed: Feb. 15, 1994

[30] Foreign Application Priority Data

| Feb. 18, 1993 | [JP] | Japan | 5-028801 |
| Mar. 11, 1993 | [JP] | Japan | 5-050420 |
| Jun. 22, 1993 | [JP] | Japan | 5-150093 |

[51] Int. Cl.[6] .................................................. G06F 15/00
[52] U.S. Cl. ........................................ 395/112; 358/455
[58] Field of Search .............................. 395/101, 109, 395/112, 117, 128, 132; 358/447, 445, 458, 462, 455, 443, 463; 430/269, 293, 297

[56] References Cited

U.S. PATENT DOCUMENTS

| 4,150,400 | 4/1979 | Wong . | |
| 4,200,044 | 4/1980 | Vested | 101/470 |
| 4,279,003 | 7/1981 | Schulz | 358/447 |
| 4,672,466 | 6/1987 | Schimpf | 358/299 |
| 4,905,097 | 2/1990 | Watanabe et al. | 358/456 |
| 4,918,543 | 4/1990 | Petilli | 358/465 |
| 5,129,011 | 7/1992 | Nishikawa et al. | 382/233 |
| 5,215,864 | 6/1993 | Laakmann | 430/293 |
| 5,229,861 | 7/1993 | Nozaka et al. . | |
| 5,289,293 | 2/1994 | Kato et al. | 358/457 |
| 5,329,381 | 7/1994 | Payne | 358/455 |

FOREIGN PATENT DOCUMENTS

| 351062 | 1/1990 | European Pat. Off. . |
| 1334529 | 10/1973 | United Kingdom . |
| 1407487 | 9/1975 | United Kingdom . |

*Primary Examiner*—Edward L. Coles, Sr.
*Assistant Examiner*—Gabriel I. Garcia
*Attorney, Agent, or Firm*—Ostrolenk, Faber, Gerb & Soffen, LLP

[57] ABSTRACT

Image data conversion processor converting a raster format of composed image data comprising line-work and picture data into a format of engraving pixel data for realizing a staggered-row screen of gravure printing cells, image density weighted for high-fidelity reproduction of tone value and line sharpness of an originally scanned image pattern. The dual-valued line-work pixels are in high concentration relative to the picture data pixels and are converted into multiple-valued line-work equivalent pixels in a picture-raster equivalent format. The multiple-valued line-work data and the picture data are assembled according to layout data operator controlled through a CRT to form the composed image data for conversion. A format converter in the processor maps the converted multiple-valued line-work equivalent pixels in the picture-raster equivalent format into gravure engraving pixels each corresponding to an engraved gravure cell of the stagger-format printing screen.

20 Claims, 28 Drawing Sheets

CURVE1

CURVE2

CURVE3

CURVE4

CURVE5

CURVE6

CURVE7

CURVE8

CURVE9

CURVE10

PIXEL AND DATA FORMAT CONVERSION PROCESSOR FOR GRAVURE

BACKGROUND OF THE INVENTION

1. Technical Field

The present invention relates to processing of printing data, scanned in a screen of image points from an image pattern which can include both line work and continuous tone portions and computer stored as pixel data in a raster or rasters corresponding to the scanning screen, making the data suitable for use in electromechanical engraving of printing forms with a screen of printing cells arranged in nested or staggered rows different from the screen arrangement of the pixel data raster(s) derived from the scanned image. More particularly, the invention relates to a gravure data processor by which stored image pixel data comprising tonal density dual-value line work pixels in a higher line-concentration raster, and multiple tone-value picture pixel data in a lower line-concentration raster, are converted into a format of engraving pixel data for realizing a nested- or staggered-row screen of gravure printing cells, image density weighted for high-fidelity reproduction of tone value and line sharpness of the originally scanned image pattern.

2. Description of the Background

Half-tone scanning of a printing subject will produce image information corresponding to a screen of scanned image pattern points which can be digitalized and stored as pixel data. The image density of the pixels (corresponding to the point tone values of the scanned image) and the format in which the pixel data are arranged will depend upon the type of printing process for which the pixel data is to be used. For offset printing, the image pattern pixel data corresponding to the printing screen of dots is mapped in rectangular rasters of pixels representing a relatively high concentration of printing dots, from between 300 to 2,000 dpi (dots/in), for example depending upon the image resolution; for character or line work, the dual-valued pixel data "0" or "1", i.e., no tone value, or full printing tone value should be in a raster of higher pixel concentration than that of the pixel raster for printing the continuous tone (picture) portions of the subject image pattern.

In contrast, in gravure printing, the cells electromechanically engraved into a printing form are arranged in lines of lower density, for example, 150 to 200 lines/in, compared with the dots/in density in offset printing, wherein each cell can be cut in a range of sizes (depths) corresponding to multiple tone-value gradations (256 in the case of 8-bit tone value resolution). If each gravure cell is to correspond to pixel data from the half-tone, digitally stored scan, the gravure pixel data must represent cells arranged in a screen substantially different from the offset printing screen. Thus, whereas pixels comprising image data for offset printing are arranged in a rectangular raster, pixels comprising image data for gravure engraving must be arranged in a format for engraving the cells in nested or staggered rows wherein non-terminal cells are each at the center of a quincunx having rectangular vertices which will not be coincident with the vertices of the offset printing screen.

Therefore, since the printing screens (and hence the respective pixel arrangements in different concentration formats) for offset and for gravure printing do not correspond, image pixel data scanned for offset printing cannot be used unaltered as engraving pixel data for gravure printing. Accordingly, when electromechanical engraving of a gravure printing form carried out using the subject image pixel data for offset printing is desired, conventionally the offset printing pixel data are read out once from the computer store, and accordingly a film of the subject is produced. The film is then scanned by a gravure engraving system scanner to provide the electronic image for engraving the printing form. This procedure is complicated and time consuming.

Where line work including characters, lines, or other writings, together with a continuous tone picture which can be a color image are to be gravure printed on the same sheet or web, according to the conventional example, it is necessary to make a film composite of combined images, laying out the line work and the picture image in the required positions. Initially in this case, monochromatic, half-tone color separation films are produced for the continuous tone (picture) portion of the subject by a color separation scanner, and a line work film is produced for the corresponding portions of the subject from the line work data by a line work output machine. A single film composite is then made from the color separation films and the line work film.

Engraving data input means in the gravure electromechanical engraving system generally includes an input section for data scanned from line work film, and a separate input section for data scanned from half-tone separations, either of which is accordingly used depending upon the nature of the film composite. The input section receiving data scanned from half-tone color separations has a feature which modifies the screen for each separation in order to prevent moire effects; however, this reduces printing fidelity. Meanwhile, although in the line-work input section the image quality from the line work film is superior to that in the color-separation input section from the half-tone films, if half-tone data is input into the line-work input section, moire effects arise. Consequently, data scanned from a film composite combined from an image comprising both line work and continuous tone (picture) portions has to be input into the half-tone input section, degrading the picture quality of the linework.

SUMMARY OF THE INVENTION

An object of the present invention is to develop, for a gravure electromechanical engraving system, gravure engraving data from half-tone screen data scanned and digitalized from a subject pattern containing line work as well as continuous-tone portions, thereby eliminating need of gravure-specific image scanning processes and separate subject image data input devices.

Another object of the present invention is to enable ready data composition for gravure engraving of image data scanned from a subject image pattern in line-work and continuous-tone separations, to form combined image data convertible to corresponding gravure engraving data, thereby eliminating need of gravure-specific image scanning processes and separate subject image data input devices.

An image data conversion processor according to an aspect of the present invention converts dual-valued line-work data comprising pixels disposed in a latticed raster format and having pixel concentration higher than that of picture data, into image data for gravure engraving in which pixels are disposed in stagger format. The processor includes line-work data converting means, data composing means, format converting means and data output means.

The line-work data converting means converts line-work data into multiple-valued line-work data having the same pixel density as the picture data. The format converting means performs interpolation using a predetermined number of data in the vicinity of virtual pixels disposed in stagger format among the multiple-valued linework data, and forms multiple-valued image data for gravure engraving corresponding to the virtual pixels. The data output means outputs to external storage, or to a gravure engraving machine. the image data for gravure engraving.

An image data conversion processor according to another aspect of the invention converts high pixel density dual-value line-work data and low pixel density multiple-valued picture data both comprising pixels disposed in latticed raster format, into image data for gravure engraving comprising pixels disposed in a stagger format. The apparatus includes line-work data converting means, data composing means, format converting means and data output means.

The line-work data converting means converts line-work data to multiple-valued linework data laving the same pixel density as that of the picture data. The data composing means forms composed image data by assembling the multiple-valued line-work data and the picture data. The format converting means performs interpolation using a predetermined number of data in the vicinity of virtual pixels disposed in stagger among the multiple-valued linework data, and forms multiple-valued image data for gravure engraving corresponding to the virtual pixels. The data output means outputs to external storage, or to a gravure engraving machine, the image data for gravure engraving.

Accordingly, the invention in the first of the foregoing aspects converts high pixel density dual-valued line-work data into multiple-valued line-work data having the same pixel density as that of the picture data, and then multiple-valued image data for gravure engraving is formed using the said multiple-valued linework data. The image data for gravure engraving is formed by performing interpolation using a predetermined number of data in the vicinity of the virtual pixels disposed in staggering. The thus formed image data for gravure engraving is output to an external storage medium or a gravure engraving machine.

Since the image data for gravure engraving is formed by converting a pixel density of the line-work data and performing interpolation using the line-work data, it is not necessary to use a gravure engraving input machine; in particular, need for an input section handling linework film is eliminated.

The invention in the second of the foregoing aspects assembles the multiple-valued line-work data and the picture data obtained as described above are assembled and subsequently the image data for gravure engraving is formed by performing interpolation using the composed data.

Since the pixel density of the multiple-valued data is the same as that of the picture data, the assembled image is readily formed by the assembling process. Furthermore, since the image data for gravure engraving is formed by interpolation using the assembled image data, use of a gravure electromechanical engraving system input means, in particular, an input section for data scanned from half-tone separations, is unnecessary.

The foregoing and other objects and advantages will be more fully evident from the following detailed description, which, together with the drawings, is illustrative of a preferred embodiment of the present invention, without intending to be restrictive of such modifications as might become apparent to persons skilled in this art.

DESCRIPTION OF PREFERRED EMBODIMENT

Figure 1:
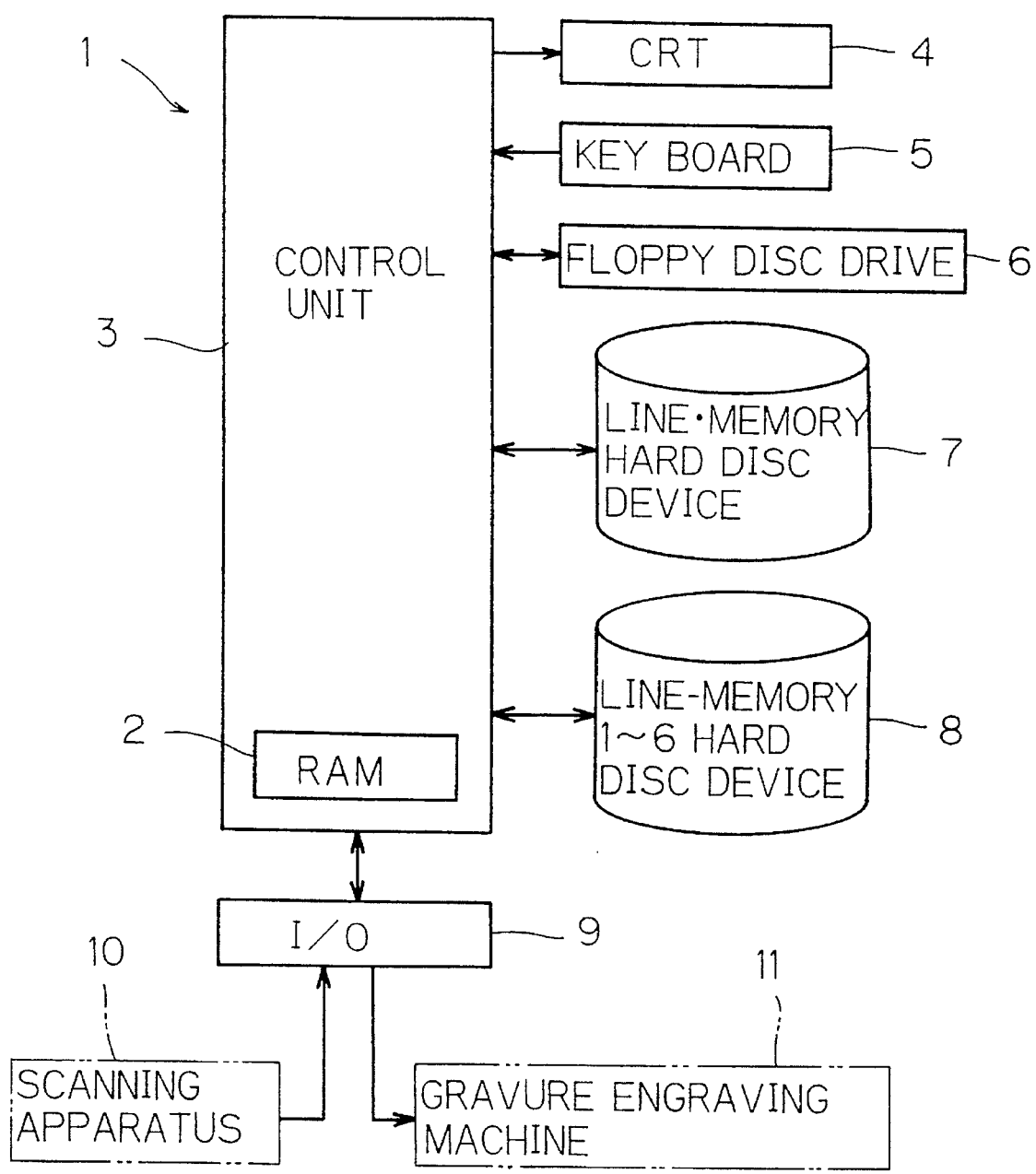
FIG. 1 is a schematic block diagram of an image data conversion processor according to the principal embodiment of the present invention.

With reference to FIG. 1, an image data pixel conversion processor 1 according to an embodiment or the present invention comprises, as a control unit 3, a computer containing a RAM 2 as well as a CPU, a ROM, and other associated elements. To the control unit 3 are connected a CRT 4 for informational display to an operator, a key board 5 through which the operator can input commands to the control unit 3, a floppy disc drive 6, a hard disc device 7 for line-work data comprising a line memory in a disc body, and a hard disc device 8 for continuous-tone image half-tone separation data (hereinafter referred to simply as picture data) comprising line memories LM 1 to LM6 in a disc body. In addition, to the control unit 3 are connected a scanning apparatus 10 (color separation scanner) for scanning picture data from a subject image pattern, and I/O port 9 as a connection to a gravure engraving machine 11 and associated components for carrying out gravure engraving operations using the gravure data.

Description of an image data conversion method executed by the image data conversion processor 1 according to an embodiment of the present invention is next made.

I. Overall Control

Figure 2:
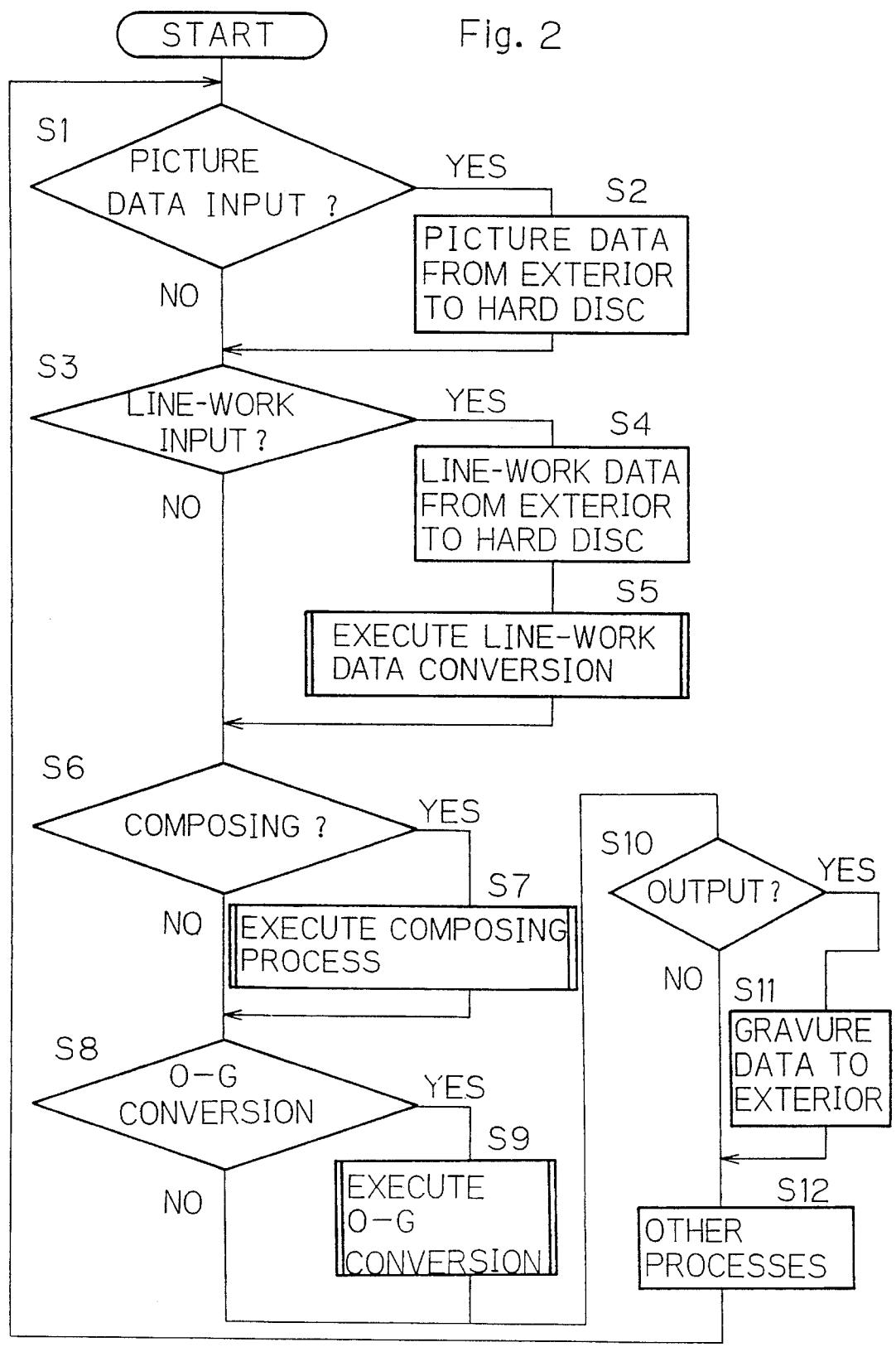
FIG. 2 is a general process control flowchart for an image data conversion operation or the processor.

Following the flow chart of FIG. 2, it is determined at step S1 whether a command for input of low pixel concentration, multiple-valued picture data is issued. When the command is issued, the program proceeds to step S2, in which picture data is obtained from the scanning apparatus 10 through the I/O ports 9, and stored in the hard disc device 8.

At step S3, it is determined whether a command for input of high pixel concentration, dual-valued line-work data is issued. Upon issue of the command, the program proceeds to step S4, in which line-work data is retrieved from a storage medium, such as an external hard disc device or the like, and stored in the hard disc device 7. Then, the program proceeds to step S5, in which the pixel concentration of the line-work data is converted to match the pixel concentration of the picture data, converting the retrieved line-work data, and also converting the dual-valued line-work data into multiple-value line-work data. The operation for converting the retrieved line-work data will be described later.

It is determined at step S6 whether a composing command is issued. When the command is issued, the program proceeds to step S7, in which a data composing procedure, described later, is carried out. It is determined at step S8 whether a command for converting off set data to gravure data is issued. The program proceeds to step S9 when the command is issued, in which the offset data in raster format is converted into a pixel format of data for gravure engraving in a staggered format (O-G conversion).

At step S10, determination is made whether a command for output of the gravure data is issued. Upon issuance of the command, the program proceeds to step S11, in which the gravure data are output to an external storage medium, or to the gravure engraving machine 11. Beyond the afore-described processes, at step S12 general processes are carried out, whereupon the program returns to step S1.

II. Line-Work Data Converting Operation

Figure 3:
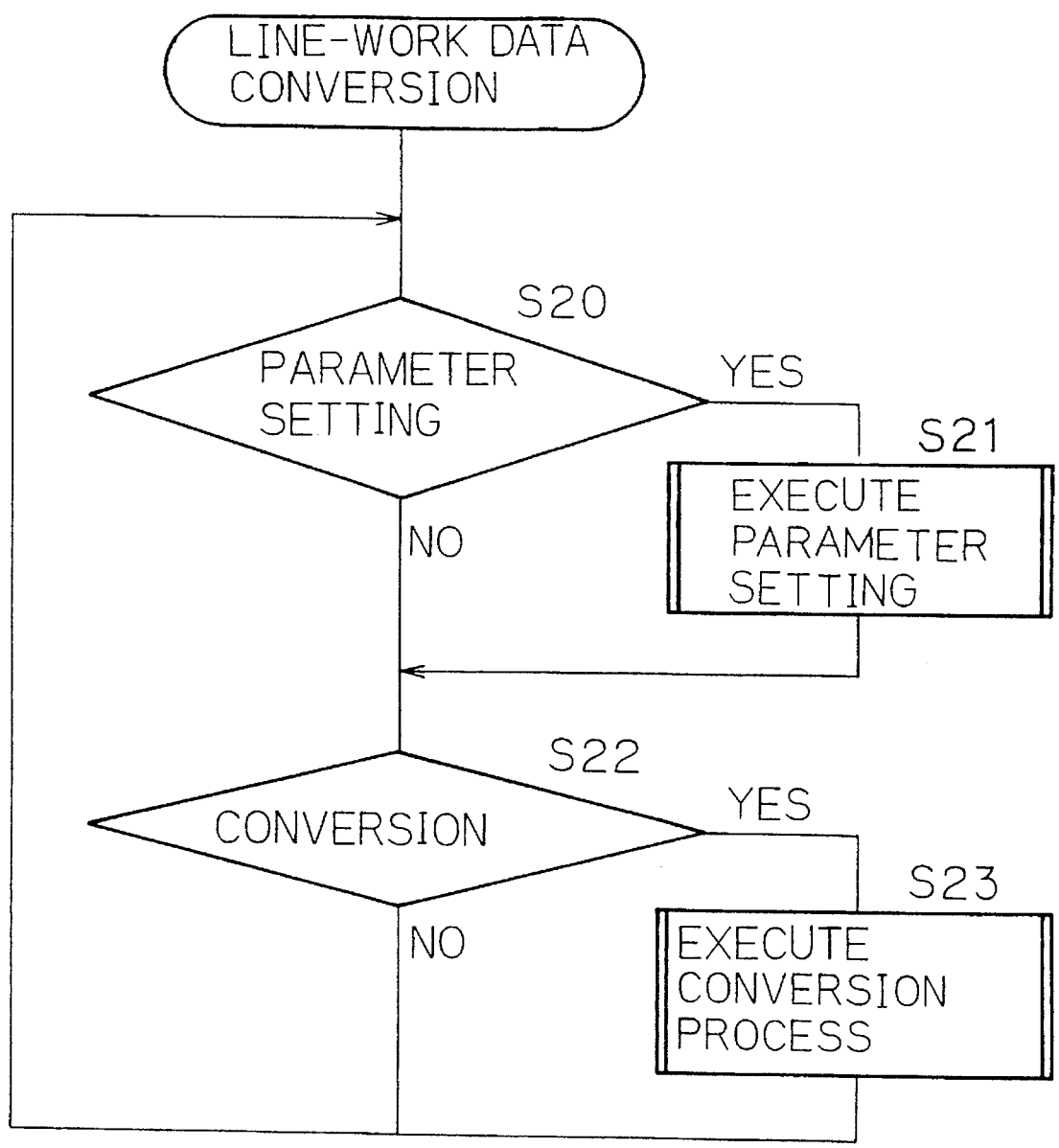
FIG. 3 is a process control flowchart for a line concentration conversion operation.
Figure 4:
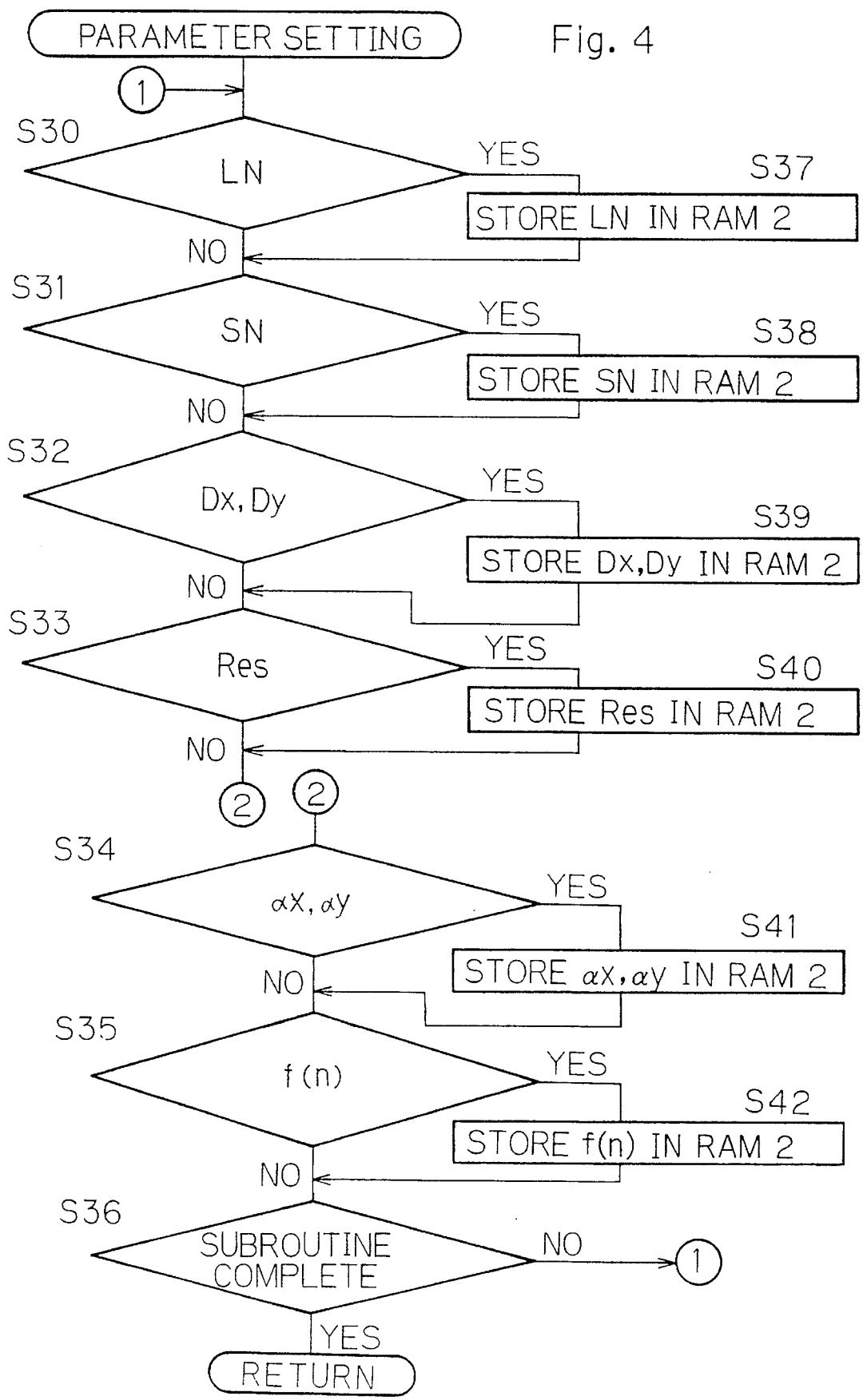
FIG. 4 is a process control flowchart for an operation setting parameters of the image data conversion operation.

Referring to FIG. 3, it is determined at step S20 whether a command is issued for setting (changing) various parameters used during the line-work data conversion to be described later. When the command is issued, the program proceeds to step S21, in which a parameter setting subroutine, diagramed in FIG. 4, is carried out. It is determined at step S22 whether a command for executing the line-work data conversion is issued; if it is, the conversion is carried out at the ensuing step S23 of the program.

Parameter Setting

Following the subroutine of the FIG. 4 flowchart, at step S30 it is determined whether pixel concentration LN of the original line-work data is input; upon input the program proceeds to step S37, in which the value LN representing the pixel concentration is stored in the RAM 2.

At step S31 it is determined whether pixel concentration SN of the converted multiple-valued line-work data is input. Upon input of the pixel concentration represented by the value SN, the program proceeds to step S38, in which SN is stored in the RAM 2.

At step S32 the program determines whether original line-work data pixel numbers $D_x$ and $D_y$ in the secondary scanning direction (x-axis) and the main scanning direction (y-axis), respectively, are input; if so the program proceeds to step S39, wherein the pixel numbers $D_x$ and $D_y$ are stored in the RAM 2.

It is determined at step S33 whether the maximum tonal value Res of the converted multiple-valued line-work data is input or not. When it is input, the program proceeds to step S40 and the maximum tonal value Res is stored in the RAM 2 as an input value.

It is determined at step S34 whether coefficients $\alpha x$ and $\alpha y$ for shifting the degree of enhancement between the secondary scanning direction and the main scanning direction. When these enhancement process data are input, the program proceeds to step S41 and the input values of the coefficients $\alpha x$ and $\alpha y$ are stored in the RAM 2.

It is determined at step S35 whether a command is issued for input for a density-gradation conversion function f(n), which converts percent scale of the minimum to maximum density range to 256 tonal value gradations, in the case of 8-bit tonal value resolution. The function is, for example a linear function, and when coefficients of the linear function are input, their values are stored in the RAM 2 at step S42.

Step S36 determines whether a Routine Complete command is issued, indicating that the setting/changing of all parameters has been completed. Wherein it is not issued, the program returns from step S36 to step S30; otherwise, when the Routine Complete command is issued, the program returns from step S36 to the routine diagramed in FIG. 3.

Line-Work Data Conversion i. Overall Operation

Figure 5:
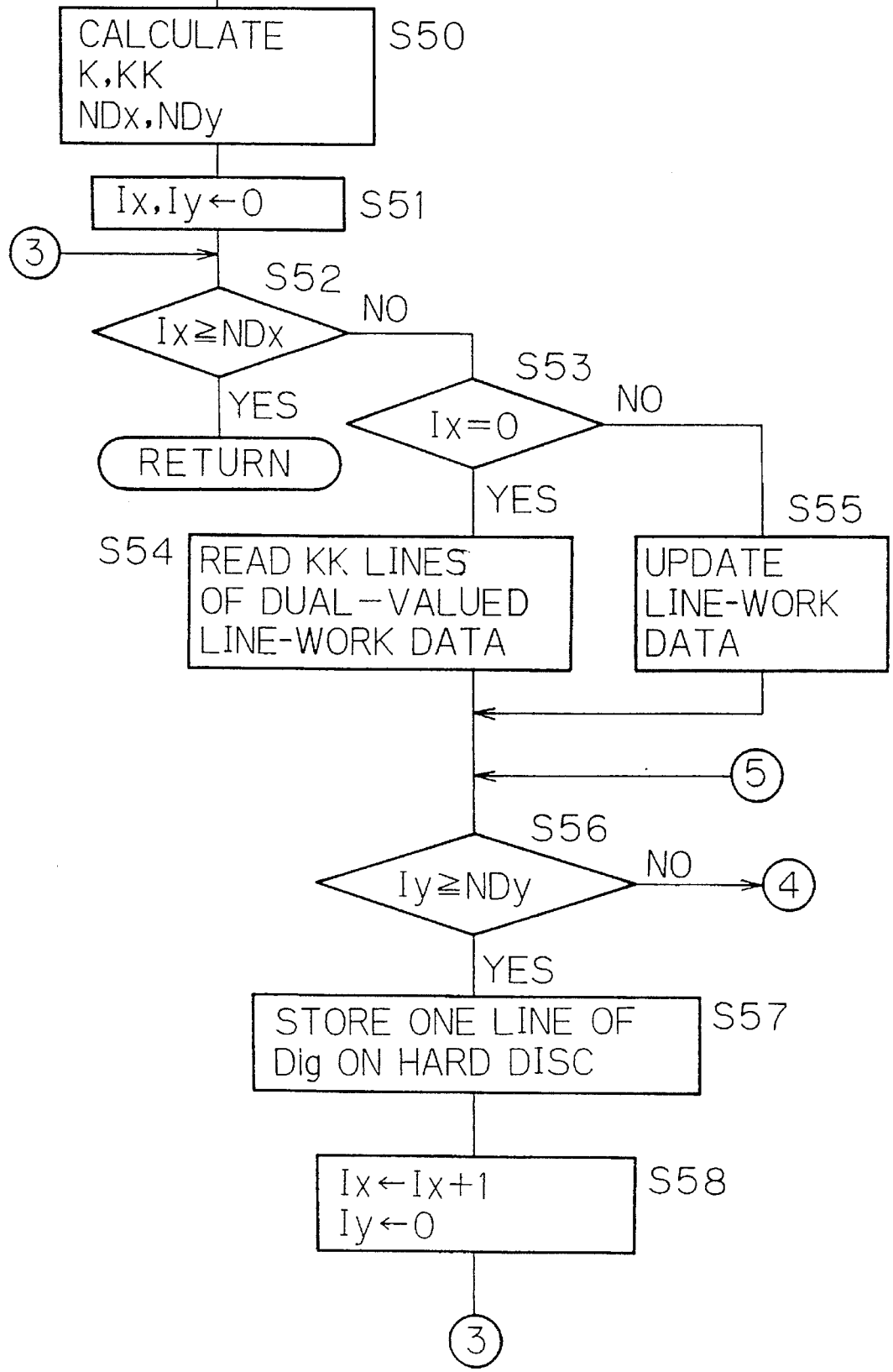
FIGS. 5–7 are process control flowcharts for a raster line and pixel conversion operation.

FIGS. 5 to 9 detail a line-work data conversion operation. Referring to FIG. 5, at step S50, using the several parameters stored in the RAM 2, values K, the size of an aperture used in a dual-value into multiple-value converting operation; KK, the size of a section used in determining an enhancement coefficient for enhancing a fine line; and pixel numbers $ND_x$ and $ND_y$ of the converted multiple-valued line-work data are calculated. The aperture size K, the section size KK, and the pixel numbers $ND_x$ and $ND_y$ are found from the following Equations (1), (2), (3) and (4), respectively.

$$K=LN/SN \qquad (1)$$

$$KK=\{(K-1)/2+1\}\times 4+1 \qquad (2)$$

$$ND_x=(int)(\{D_x-(KK-K)\}/K] \qquad (3)$$

$$ND_y=(int)\ (\{D_y-(KK-K)\}/K] \qquad (4)$$

At step S51, variables $I_x$ and $I_y$ designating positions along the secondary and main scanning directions, respectively, are initialized, that is, set to "0".

It is determined at step S52 whether the variable $I_x$ is equal to or more than the pixel number $ND_x$. Wherein the variable $I_x$ is less than $ND_x$, the program proceeds to step S53, at which it is determined whether the variable $I_x$ is equal to "0" or not. Wherein it is equal to "0", the program proceeds to step S54.

At step S54, dual-valued line-work data, corresponding to lines in section size KK along the secondary scanning direction, and thus including the original data block for conversion (i.e., the pixels in the K-sized aperture, hereinafter referred to simply as conversion pixels) together with a surrounding reference data section (i.e., the pixels in the KK-sized section, hereinafter referred to simply as reference pixels), are read from the hard disc device 7 into a buffer area of the RAM 2.

Figure 17:
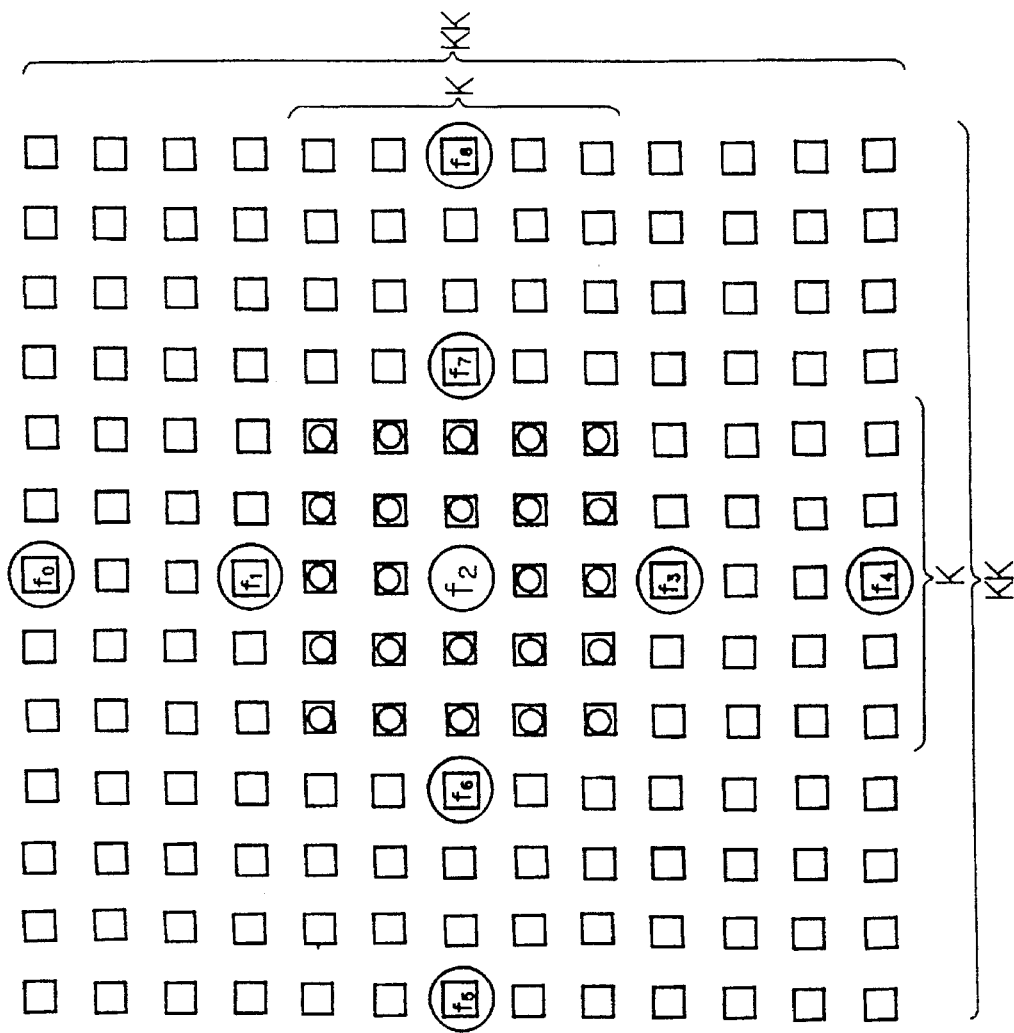
FIG. 17 is a schematic diagram illustrating a pixel conversion aperture and surrounding reference section in a raster of dual tone-density value image data, in the raster line and pixel conversion operation.

FIG. 17 illustrates an example of a section of pixels of the line work read as the data group at step S54. In this case, the aperture size K is set to "5" (hence, from Equation (2), KK is "13"), and conversion pixels in a 5×5 grid, which will correspond to one pixel of the multiple-valued line-work data, is located in the center of the data group. Therein, the reference pixels surround the conversion pixels.

It is determined at step S56 whether the variable $I_y$ is equal to or greater than the pixel number $ND_y$. Wherein the variable $I_y$ is less than $ND_y$ the program proceeds to step S59 of the flowchart of FIG. 6.

At step S59, pixel position Id (x,y) of the K×K conversion pixels are determined according to Formulas [1] and [2] from among those line-work data in the lines corresponding to KK stored in the buffer area of the RAM 2, and the conversion pixels which have said position are copied into a first work area of the RAM 2.

$$(KK-K)/2 \leq x \leq (KK+K)/2-1 \qquad [1]$$

$$K \times I_y + (KK-K)/2 \leq y \leq K \times I_y + (KK+K)/2 - 1 \qquad [2]$$

Therein, referring to FIG. 17, the variable x is an integer representing a pixel position of the line-work data in the secondary scanning (horizontal) direction, and the variable y is an integer representing a pixel position of the line-work data in the main scanning (vertical) direction.

At step S60, a representative reference pixel is calculated every three pixels in the main and secondary scanning directions, centering around a pixel $f_2$, which is the center of the conversion pixels.

Then, the nine representative reference pixels $f_o$ to $f_s$ including the central pixel $f_2$ are copied into the first work area of the RAM 2. The positions of the representative reference pixels $f_o$ to $f_4$ disposed in the main scanning direction are determined according to the following Equation (5), and the results are copied into a second work area of the RAM 2. Meanwhile, the positions of the representative reference pixels $f_2$ and $f_s$ to $f_s$ disposed in the secondary scanning direction are determined according to Equation (6) below, and the results are copied into a third work area of the RAM 2.

$$X=(KK-1)/2$$

$$Y=K \times I_y + (s-1) \times [(KK-1)/4] \qquad (5)$$

$$X=(s-1) \times [(KK-1)/4]$$

$$Y=K \times I_y + (KK-1)/2 \qquad (6)$$

wherein the variable s is an integer 1 to 5.

At steps S61, S62, and S63, a dual-value into multiple-value converting subroutine (FIG. 7), an enhancement coefficient determining subroutine (FIG. 8), and a data enhancing and developing subroutine (FIG. 9), respectively, are carried out. Each of these subroutines will be described later.

The thus obtained single-pixel data $D_{1g}$, of the multiple-valued line-work data is stored singly in the line memory LM of the hard disc device 7 at step S64. At step S65, the variable $I_y$ is incremented (more specifically, the data group to be converted is shifted in the main scanning direction), and then the program returns to step S56 of FIG. 5.

After the line-work data conversion in the main scanning direction is completed, the determination at step S56 is "YES;" hence the program proceeds to step S57.

At step S57, the series of single-pixel data $D_{ig}$ which have been stored in the line memory LM are stored collectively as one line of data in the body of the hard disc device 7. At step S58, the variable $I_x$ is incremented and "0" is substituted for the variable $I_y$, and then the program returns to step S52.

At step S52, wherein the variable $I_x$ is less than the number of pixels $ND_x$, the program proceeds to step S53. At step S53, since the variable $I_x$ is not "0", the program proceeds to step S55.

At step S55, the line-work data corresponding to lines in K (in the present example, 5 lines) stored in the buffer area of the RAM 2 is shifted in the secondary scanning direction, and new line-work data corresponding to lines in KK is read from the buffer area of the RAM 2, updating the line-work data to be processed.

Thereafter, steps S56 to S65 are executed likewise described above, and then the program returns to step S52.

When all line-work data conversion with respect to the main and secondary scanning directions is completed, the determination at step S52 is "YES", and the program then returns to the routine of FIG. 3.

ii. Dual-Value into Multiple-Value Converting Operation

Figure 6:
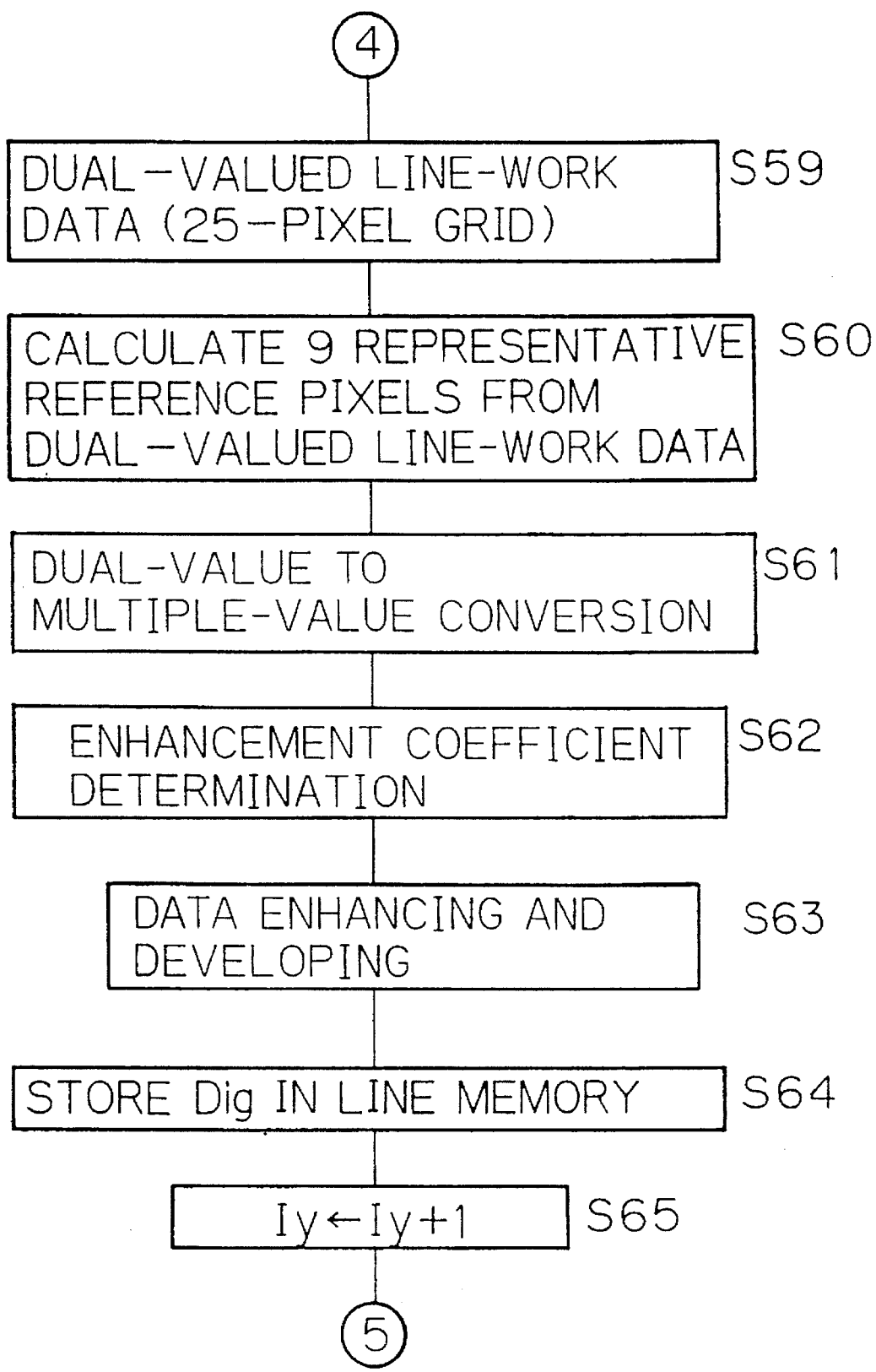
Figure 7:
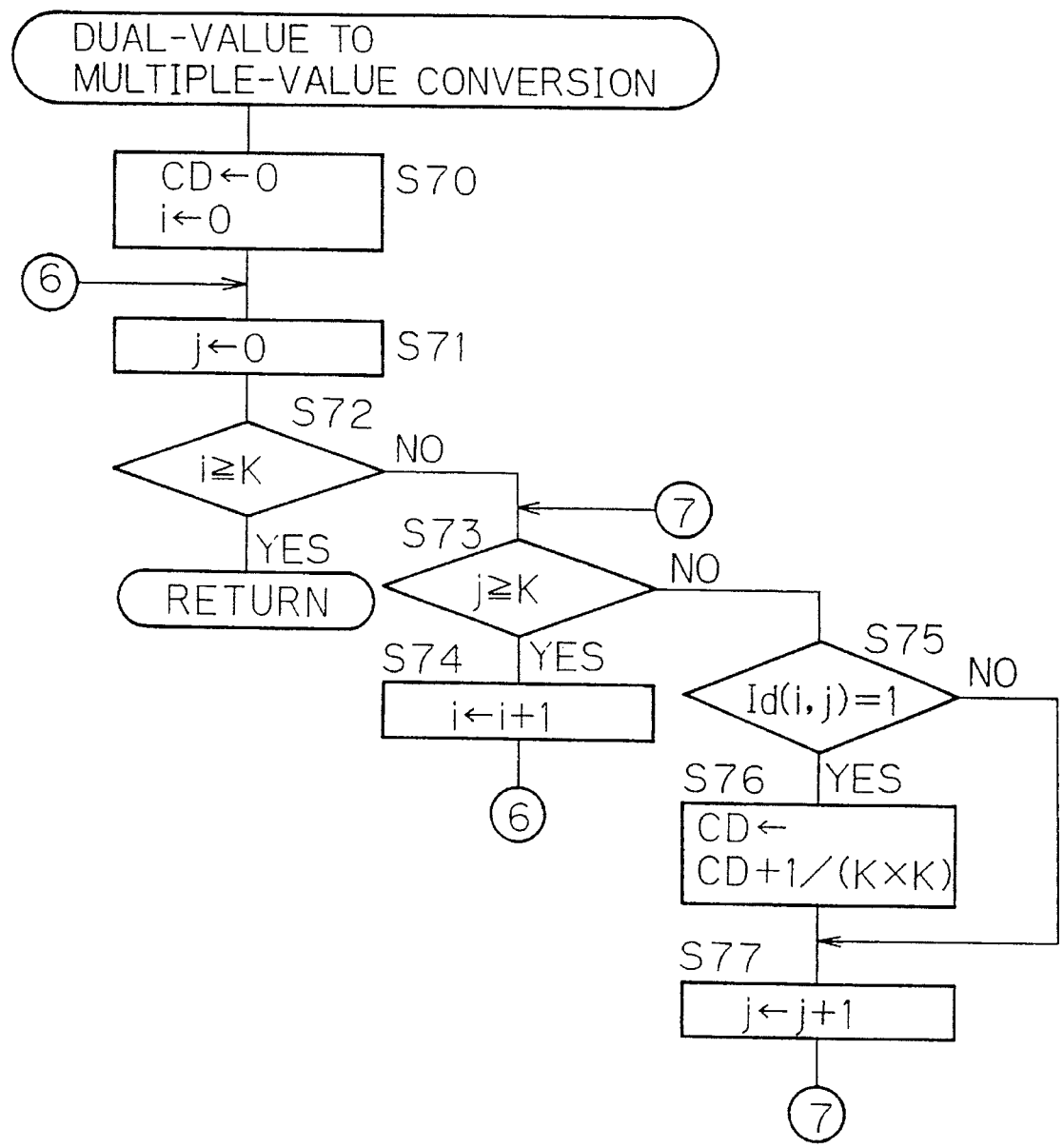

According to the dual-value into multiple-value converting subroutine diagramed in FIG. 7 (executed at step S61 of FIG. 6), a multiple-valued count variable CD and a secondary scanning-direction variable i are initialized to "0" at step S70. A main scanning-direction variable j is initialized to "0" at step S71.

It is determined at step S72 whether the variable i is equal to or greater than the aperture size K. Wherein the variable i is less, the program proceeds to step S73, in which it is determined whether the variable j is equal to or greater than the aperture size K. Wherein the variable j is less, the program proceeds to step S75.

It is determined at step S75 whether the conversion pixel Id (i,j), which was copied into the first work area of the RAM 2, is "1" Wherein the conversion pixel Id is "1", the program proceeds to step S76. At step S76, [1/(K×K)] is added to the multiple-valued count variable CD. Wherein the conversion pixel Id is "0" at step S75, step S76 is not executed.

At step S77, the variable j is incremented, and then the program returns to step S73. Wherein the determination at step S73 is "YES", the program proceeds to step S74, in which the variable i is incremented. Subsequently, the program returns to step S71.

After operations for all conversion pixels in the aperture (K×K) i.e., in the first work area, are completed, the determination at step S72 is "YES", and the program then returns to the subroutine of FIG. 6. in addition at this stage, at step S76, the multiple-valued count variable CD is set to a density value (0≦CD≦1) based on the ratio of the number of maximum-value pixels (i.e., binary-coded "1") to the total number of pixels within the area of the aperture (K×K).

iii. Enhancement Coefficient Determining Operation

Figure 8:
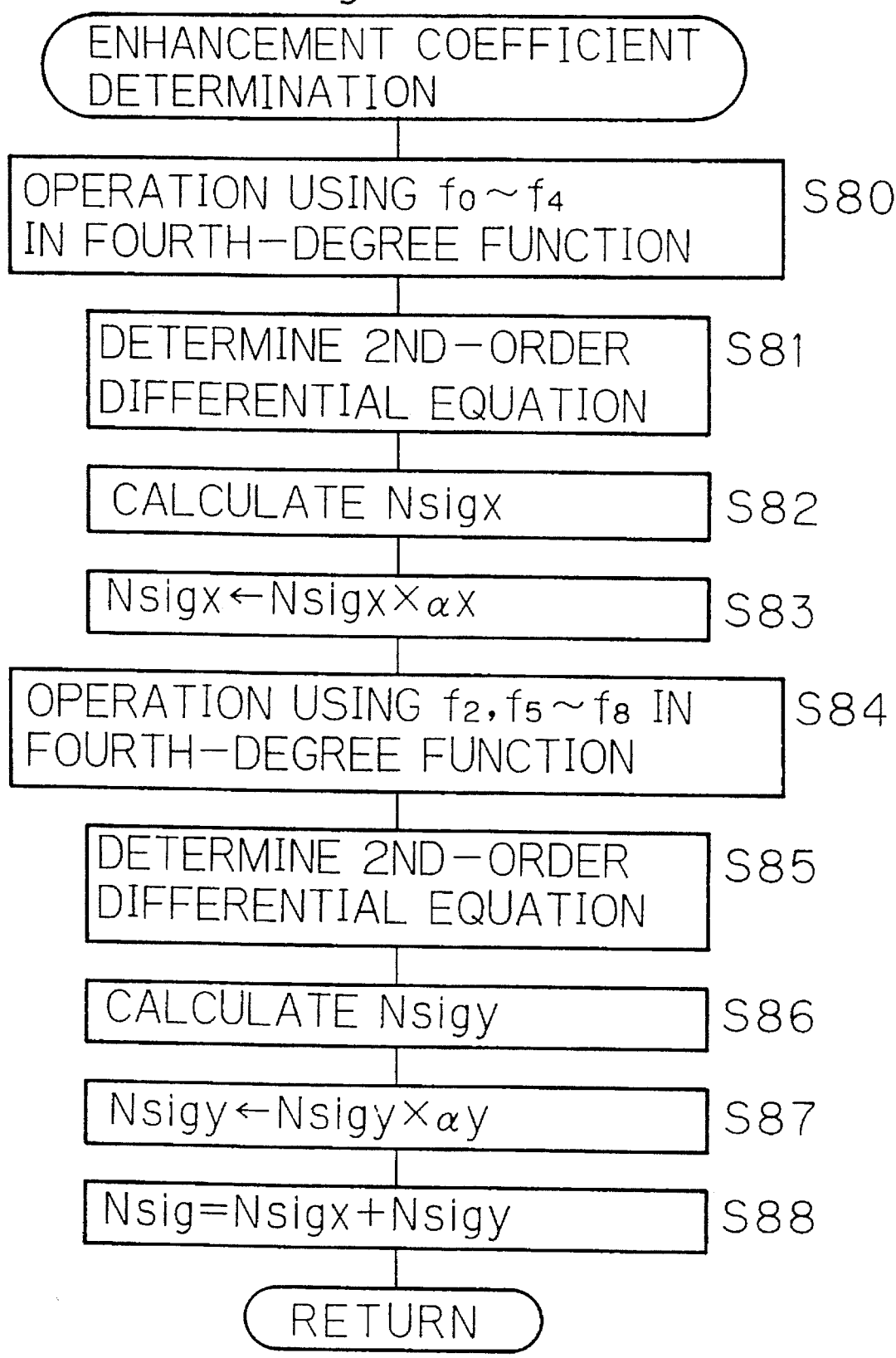
FIG. 8 is a process control flowchart of a pixel enhancement operation.

Referring to FIG. 8 illustrating the enhancement coefficient determining subroutine, at step S62 (FIG. 6), a fourth-degree function is determined using the line-work data of representative reference pixels $f_o$ to $f_4$, copied into the second work area of the RAM 2 at step S80. The fourth-degree function is written using Lagrangian interpolation, as in the following Equation (7).

$$f(x) = \frac{(x-x_{i-1})(x-x_i)(x-x_{i+1})(x-x_{i+2})}{24} \cdot f_{i-2} - \qquad (7)$$

$$\frac{(x-x_{i-2})(x-x_i)(x-x_{i+1})(x-x_{i+2})}{6} \cdot f_{i-1} +$$

$$\frac{(x-x_{i-2})(x-x_{i-1})(x-x_{i+1})(x-x_{i+2})}{4} \cdot f_i -$$

$$\frac{(x-x_{i-2})(x-x_{i-1})(x-x_i)(x-x_{i+2})}{6} \cdot f_{i+1} +$$

Figure 18:
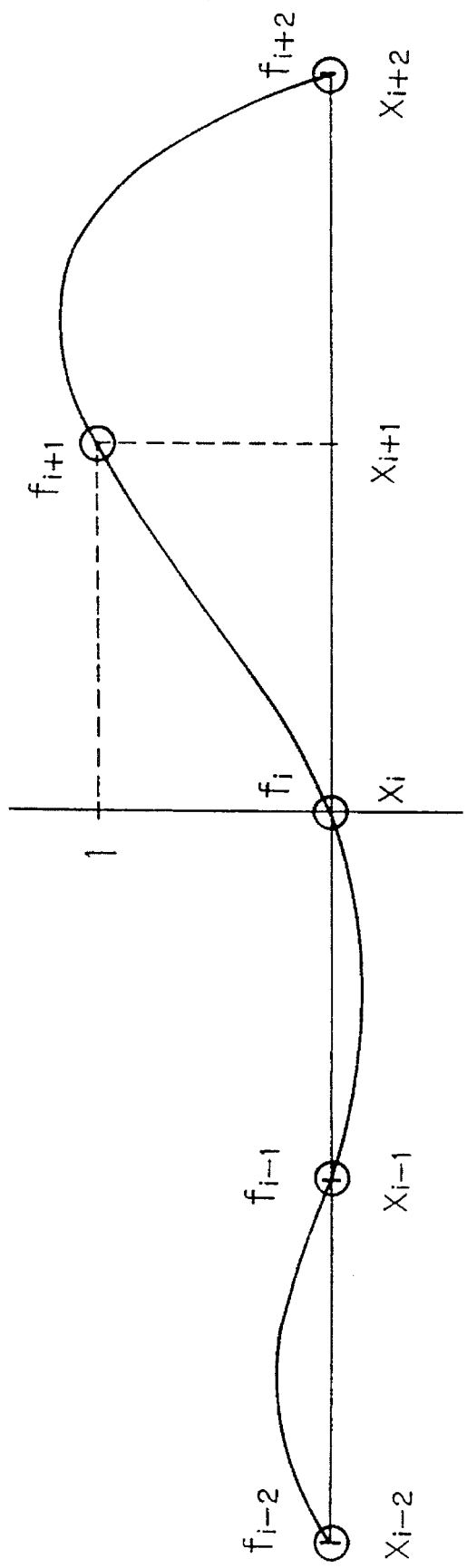
FIGS. 18–28 are solution curves of a fourth-degree function written to associate representative reference pixel tone value with corresponding pixel raster position in the conversion aperture and surrounding reference section.
Figure 19:
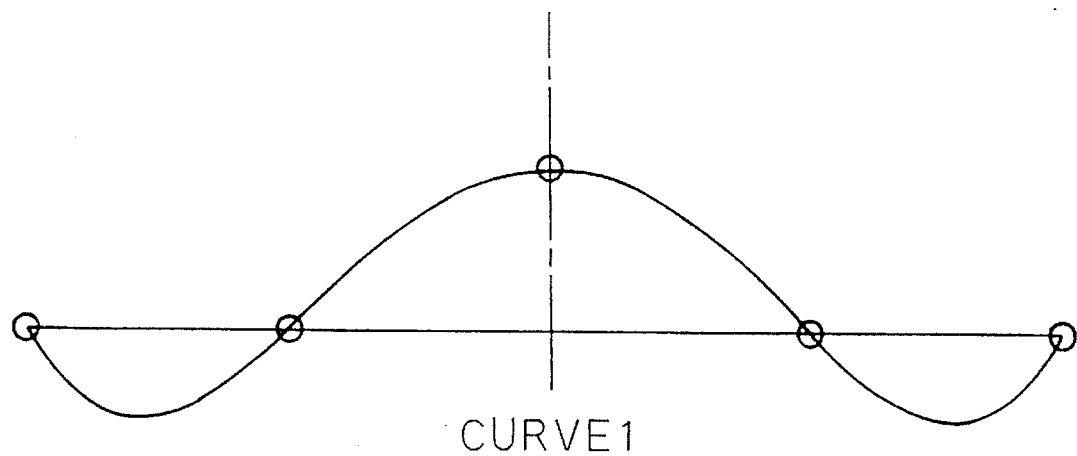
Figure 20:
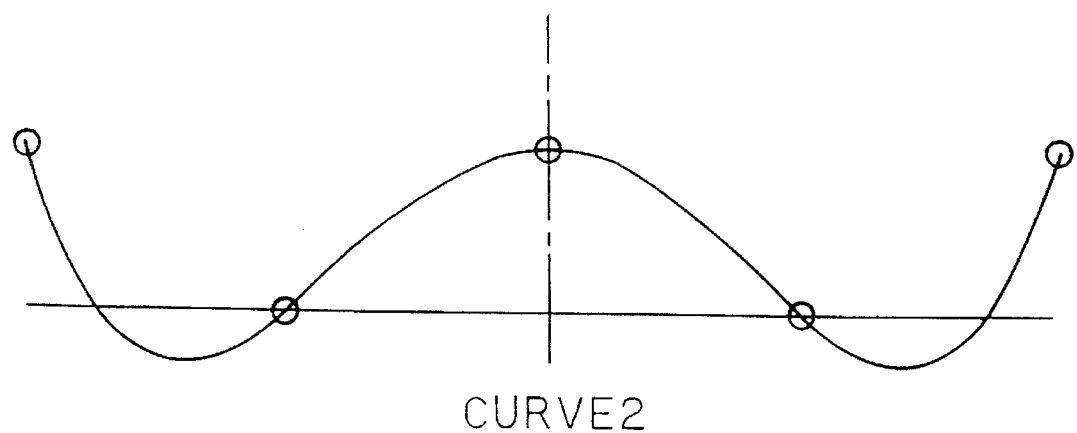
Figure 21:
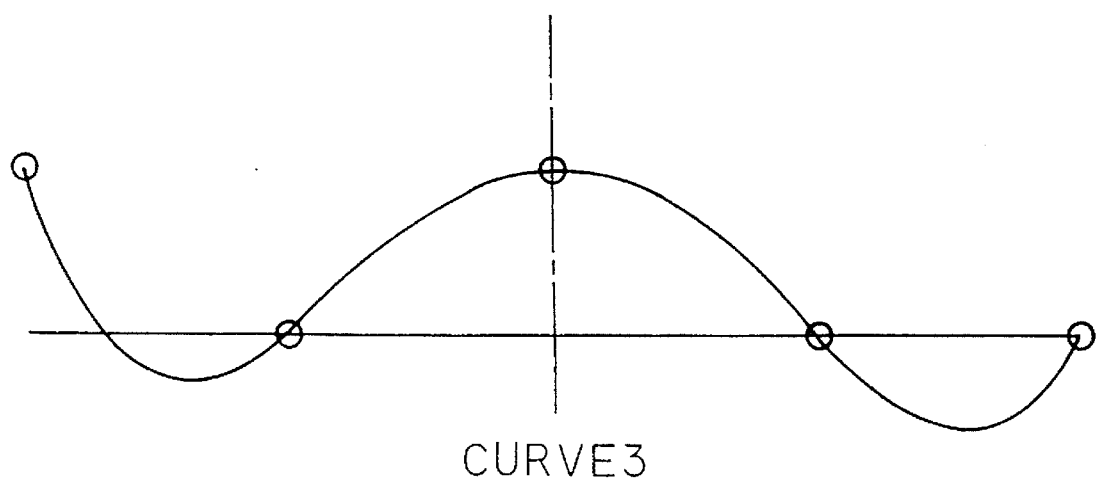
Figure 22:
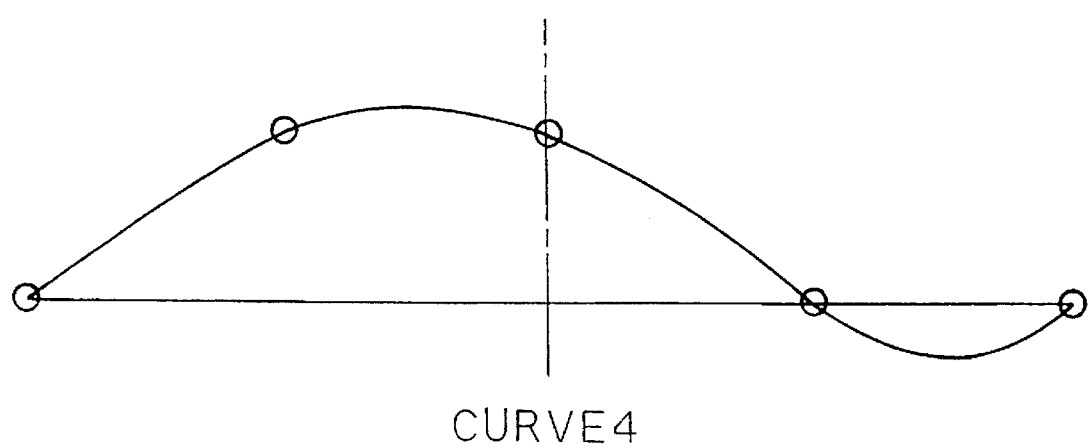
Figure 23:
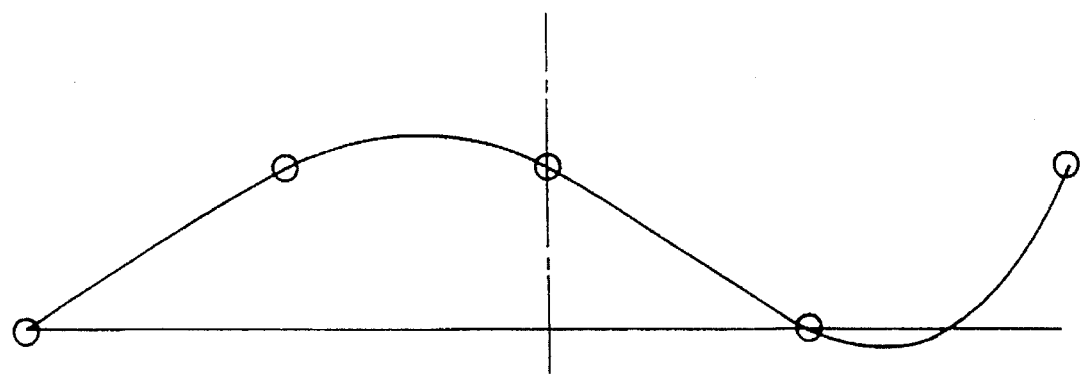

-continued
$$\frac{(x-x_{i-2})(x-x_{i-1})(x-x_i)(x-x_{i+1})}{24} \cdot f_{i+2}$$

where each x is a position coordinate value for corresponding representative reference pixels $f_o$ to $f_4$ surrounding the pixel $f_2$, and each r is the data element value of the representative reference pixels $f_o$ to $f_4$. FIG. 18 graphs an example of a fourth-degree curve accordingly relating the values of x to those of f.

in the operation performed at step S80, there are ten possible solution curves, as graphed in FIGS. 19 to 28, to the fourth-degree function.

Figure 24:
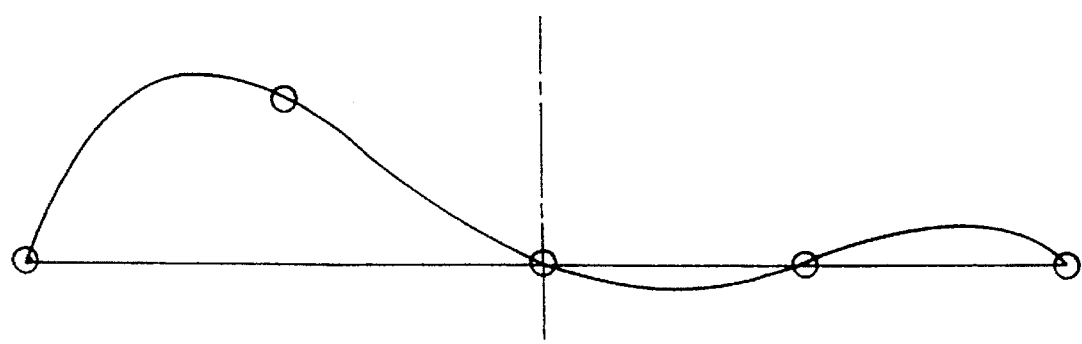
Figure 25:
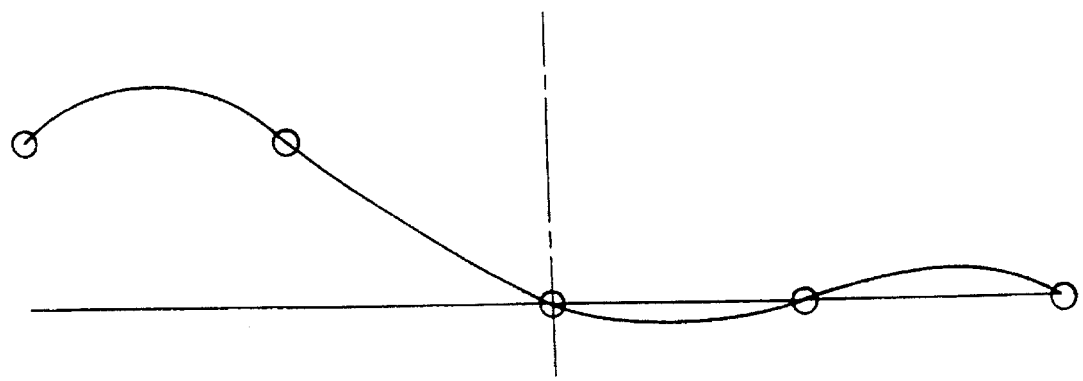
Figure 26:
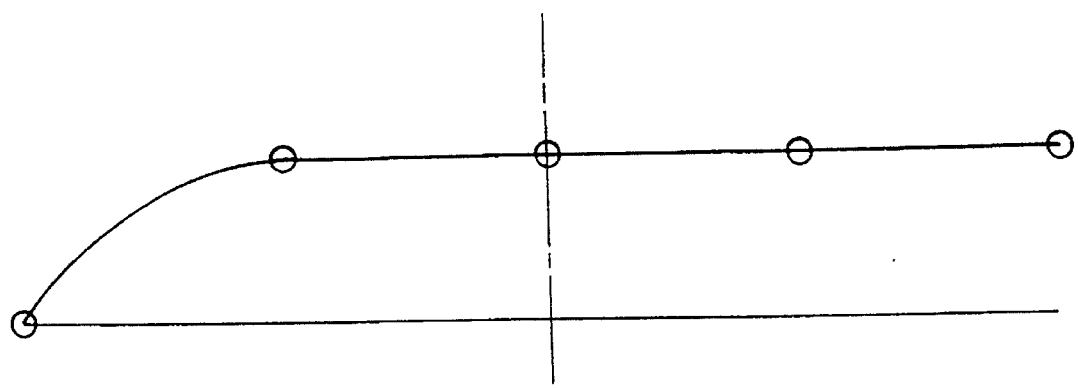
Figure 27:
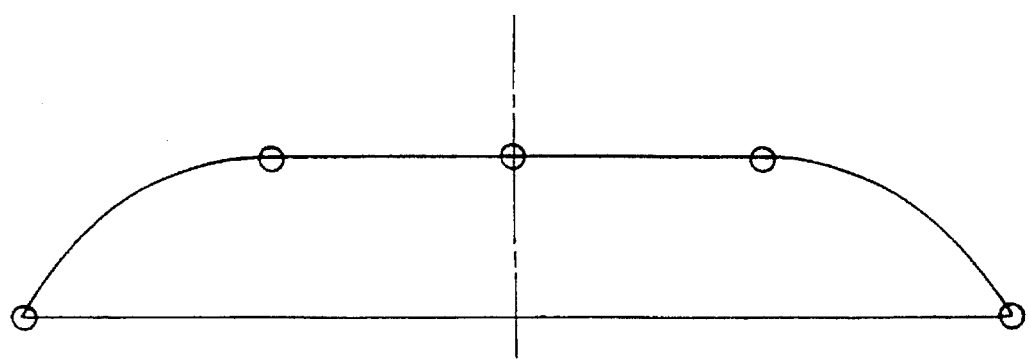
Figure 28:
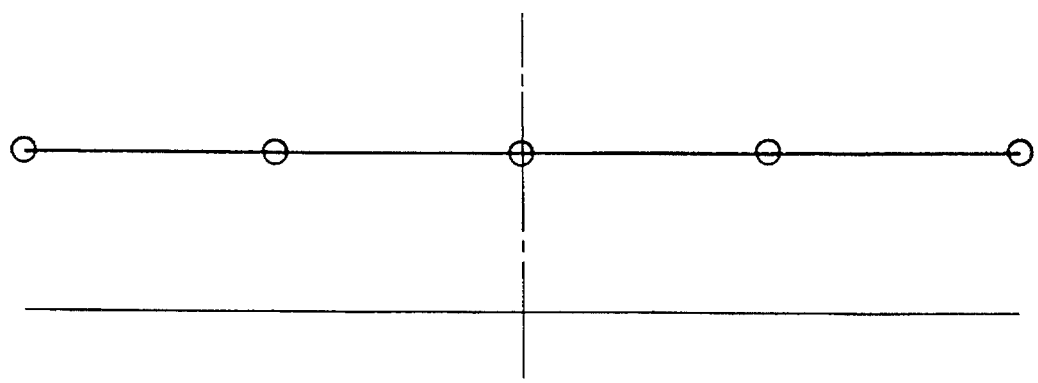
Figure 29:
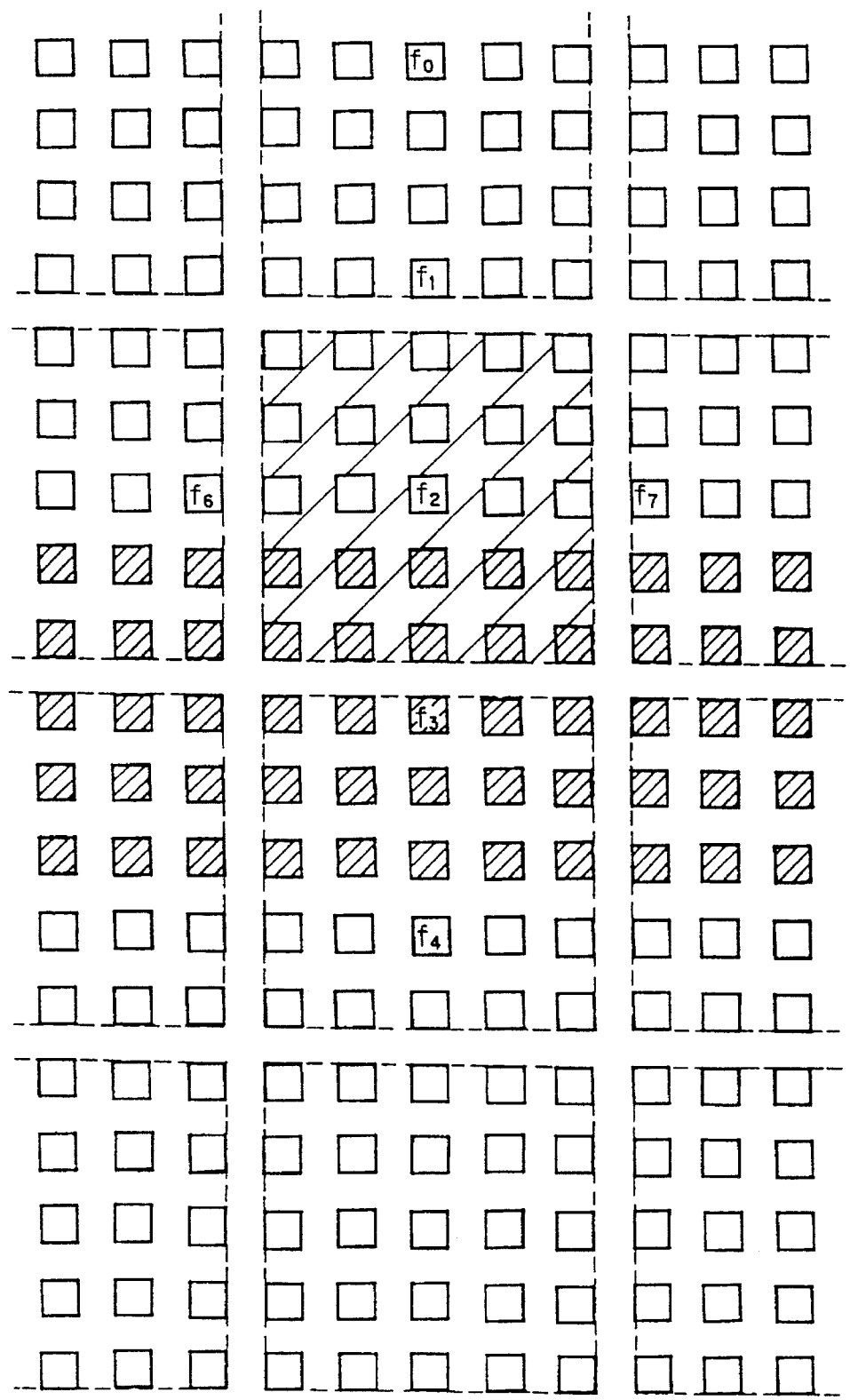
FIG. 29 is a schematic diagram illustrating a region divided by the apertures of a raster of dual tone-density value pixels comprising a portion of a fine black line.
Figure 30:
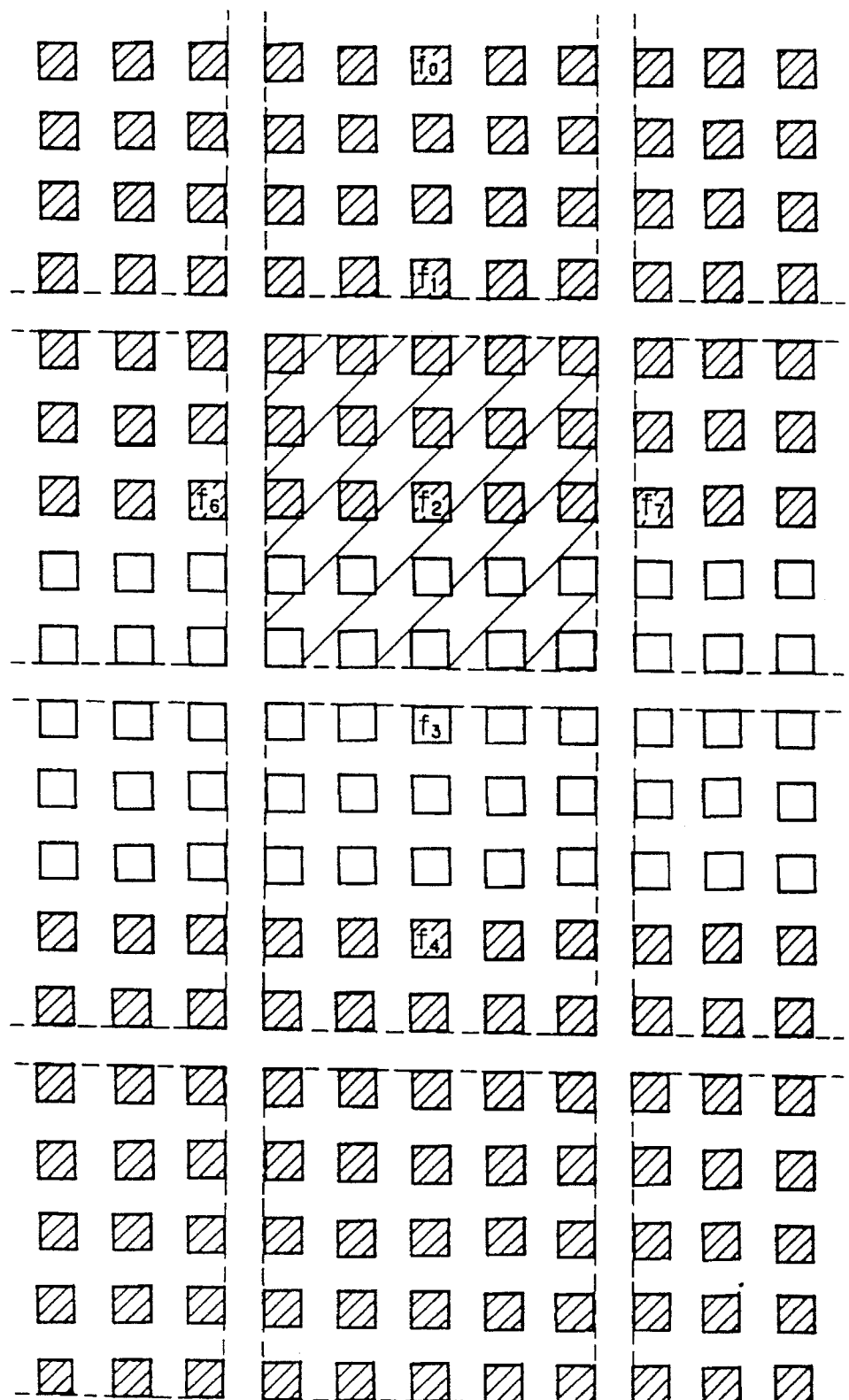
FIG. 30 is a schematic diagram illustrating a region divided by the apertures of a raster of dual tone-density value pixels comprising a portion of a fine white line.

Taking as an isolated example a long, black, fine line coincident with the secondary scanning direction, drawn on a white background, and five pixels in width in the main scanning direction as illustrated in FIG. 29, the solution of the fourth-degree function written at step S80, determined accordingly by the representative reference pixels, is Curve 6, graphed in FIG. 24. A subject image the reverse (image-negative) of the FIG. 29 example, as illustrated in FIG. 30, reverses the signs in Equation (7); nevertheless, the solution curve for f(x) is the same, i.e., Curve 6 of FIG. 24.

At step S81, a linear differential equation based on the fourth-degree function written at step S80 is determined according to the following Equation (8). Furthermore, a second-order differential equation is determined according to the following Equation (9).

$$F'(x) = \left(-\frac{f_{i+1}}{6} + \frac{f_{i+2}}{24}\right)(x-x_{i-2})(x-x_{i-1})(x-x_i) + \tag{8}$$

$$\left(\frac{f_i}{4} + \frac{f_{i+2}}{24}\right)(x-x_{i-2})(x-x_{i-1})(x-x_{i+1}) +$$

$$\left(\frac{f_i}{4} - \frac{f_{i+1}}{6}\right)(x-x_{i-2})(x-x_{i-1})(x-x_{i+2}) +$$

$$\left(-\frac{f_{i-1}}{6} + \frac{f_{i+2}}{24}\right)(x-x_{i-2})(x-x_i)(x-x_{i+2}) +$$

$$\left(-\frac{f_{i-1}}{6} - \frac{f_{i+1}}{6}\right)(x-x_{i-2})(x-x_i)(x-x_{i+2}) +$$

$$\left(-\frac{f_{i+1}}{6} + \frac{f_i}{4}\right)(x-x_{i-2})(x-x_{i+1})(x-x_{i+2}) +$$

$$\left(\frac{f_{i-2}}{24} + \frac{f_{i+2}}{24}\right)(x-x_{i-1})(x-x_i)(x-x_{i+1}) +$$

$$\left(\frac{f_{i-2}}{24} - \frac{f_{i+1}}{6}\right)(x-x_{i-1})(x-x_1)(x-x_{i+2}) +$$

$$\left(\frac{f_{i-2}}{24} + \frac{f_i}{4}\right)(x-x_{i-1})(x-x_{i+1})(x-x_{i+2}) +$$

$$\left(\frac{f_{i-2}}{24} - \frac{f_{i-1}}{6}\right)(x-x_i)(x-x_{i+1})(x-x_{i+2})$$

$$F''(x) = \left(\frac{f_i}{2} - \frac{f_{i+1}}{3} + \frac{f_{i+2}}{12}\right)(x-x_{i-2})(x-x_{i-1}) + \tag{9}$$

$$\left(-\frac{f_{i-1}}{3} - \frac{f_{i+1}}{3} + \frac{f_{i+2}}{12}\right)(x-x_{i-2})(x-x_i) +$$

$$\left(-\frac{f_{i-1}}{3} - \frac{f_i}{2} + \frac{f_{i+2}}{12}\right)(x-x_{i-2})(x-x_{i+1}) +$$

$$\left(-\frac{f_{i-1}}{3} + \frac{f_i}{2} - \frac{f_{i+1}}{3}\right)(x-x_{i-2})(x-x_{i+2}) +$$

$$\left(\frac{f_{i-2}}{12} - \frac{f_{i+1}}{3} + \frac{f_{i+2}}{12}\right)(x-x_{i-1})(x-x_i) +$$

$$\left(\frac{f_{i-2}}{12} + \frac{f_i}{2} + \frac{f_{i+2}}{12}\right)(x-x_{i-1})(x-x_{i+1}) +$$

$$\left(\frac{f_{i-2}}{12} + \frac{f_i}{2} - \frac{f_{i+1}}{3}\right)(x-x_{i-1})(x-x_{i+2}) +$$

$$\left(\frac{f_{i-2}}{12} - \frac{f_{i-1}}{3} + \frac{f_{i+1}}{12}\right)(x-x_i)(x-x_{i+1}) +$$

$$\left(\frac{f_{i-2}}{12} - \frac{f_{i-1}}{3} - \frac{f_{i+1}}{3}\right)(x-x_i)(x-x_{i+2}) +$$

$$\left(\frac{f_{i-2}}{12} - \frac{f_{i-1}}{3} + \frac{f_i}{2}\right)(x-x_{i+1})(x-x_{i+2})$$

At step S82, enhancement coefficient $N_{sigx}$ in a secondary scanning direction is calculated according to the following Equation (10) using the determined linear and second-order differential equations.

$$N_{sigx}=(F''(i-1)\times F''(i)^3\times F''(i+1))/(F'(i-2)\times F'(i+1)) \tag{10}$$

At step S83, the enhancement coefficient component $N_{sigx}$ obtained at step S82 is graduated by correction factor $\alpha_x$ (from step S41), developing a corrected enhancement coefficient component $N_{sigx}$ in the secondary scanning direction.

Steps S84 to S87 are the same as steps S80 to S83, with the exception that the representative reference pixels used in determining the equations from which the enhancement coefficient component $N_{sigy}$ are derived are $f_2$, and $f_5$ to $f_8$, as copied into the third work area of the RAM 2. Thus, enhancement coefficient component $N_{sigy}$ is calculated at step S86 is for enhancement in the main scanning direction.

At step S88, the enhancement coefficient components $N_{sigx}$ and $N_{sigy}$ are added together, whereby a final enhancement coefficient $N_{sig}$ is obtained. Then, the program returns to step S59 of FIG. 6.

iv. Data Enhancing and Developing Operation

Figure 9:
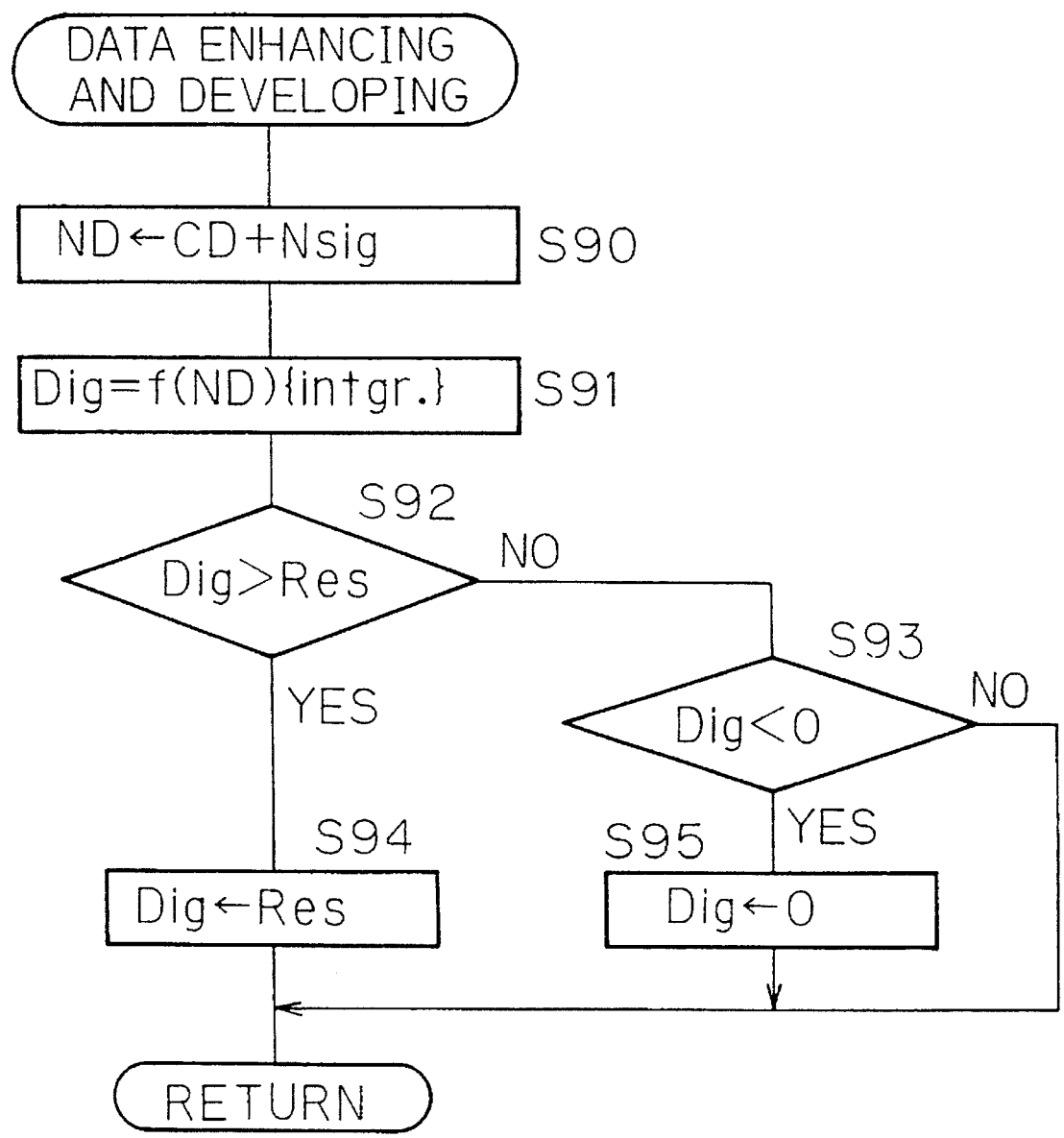
FIG. 9 is a process control flowchart for a data combining operation.

Referring to the FIG. 9 flowchart illustrating the data enhancing and developing subroutine executed at step S63, the enhancement coefficient $N_{sig}$ (FIG. 8) is added to the multiple-valued count variable CD (FIG. 7) at step S90, and the result is graduated by 100, yielding the density value ND for a single pixel of the multiple-valued line-work data. At step S91, multiple-valued line-work data elements $D_{ig}$ are derived by evaluating the density-gradation conversion function f(n) (for which coefficients have been set at step S42 of FIG. 4) for each ND and taking the integer portion of the result. The function f(n) therein is, for example $$D_{ig}=2.28(ND)+28.$$

At step S92 the program determines whether each multiple-valued line-work data element $D_{ig}$ exceeds the maximum tonal value Res (from step S40 of FIG. 4). If so, the program proceeds to step S94, in which the data element $D_{ig}$ is set to the maximum tonal value Res. Alternatively, if the determination at step S92 is "No", the program proceeds to step S93, from which for negative values of data element $D_{ig}$ the program proceeds to step S95. At step S95, the data element $D_{ig}$ is set to "0". On the other hand, wherein the determination at step S93 is "No", $D_{ig}$ accordingly is not changed.

Summary—Line-Work Data Converting Operation

According to the afore-described aspect of the present invention, a data variation pattern of the conversion pixels and the plurality of representative reference pixels in the reference data section are expressed by the fourth-degree function. Wherein the conversion pixels comprise part of fine lines in the image, since the data variation pattern is corrected according to the function in the direction enhancing the density value of the converted multiple-valued line-work data, reproducibility of the fine lines when the high pixel concentration line-work data is converted to the low pixel concentration multiple-valued line-work data is improved. Thus, fine lines in the duplicated image will be clearly distinguishable.

Line-Work Conversion (a) The enhancement coefficient components $N_{sigx}$ and $N_{sigy}$ may be calculated using Table 1 as follows and Equation (11) below instead of Equation (10) at steps S82 to S86.

$$J_s = int\ [100 \times F''(i)] \qquad (11)$$

wherein the integer portion "int" of the calculated result is taken.

The enhancement coefficient components $N_{sigx}$ and $N_{sigy}$ are determined from the obtained value $J_s$ by reference to Table 1 below.

TABLE 1

| $J_s$ | −250 | −267 | −259 | −117 | −125 | 133 | 8 | 16 | 0 |
|---|---|---|---|---|---|---|---|---|---|
| $N_{sig}$ | 0.2 | 0.2 | 0.2 | 0.2 | 0.15 | 0.35 | 0.0 | 0.0 | 0.0 |
| | 250 | 267 | 259 | 117 | 125 | −133 | −8 | −16 | |
| | −0.2 | −0.2 | −0.2 | −0.2 | 0.15 | 0.35 | 0.0 | 0.0 | | wherein the data in Table 1 have been stored in the RAM 2 as a reference table and represent values previously obtained experimentally.

(b) At steps S80, S81, S84 and S85, patterns may be established according to five dual-valued ("0" or "1") representative reference pixels (more specifically, the ten patterns as shown in FIGS. 18–28, and ten additional patterns which are the reverse, or "negative image" complements, of the former ten patterns, i.e., twenty patterns in all are established), and the value $J_s$ may be determined using data shown in Table 2, instead of calculating the fourth-degree function and the differential equations based upon it.

TABLE 2

| Pattern | 1 | 2 | 3 | 4 | 5 | 6 | 7 | 8 | 9 | 10 |
|---|---|---|---|---|---|---|---|---|---|---|
| $J_s$ | −250 | −267 | −259 | −117 | −125 | 133 | 125 | 8 | 16 | 0 |
| | 1 | 2 | 3 | 4 | 5 | 6 | 7 | 8 | 9 | 10 |
| | 250 | 267 | 259 | 117 | 125 | −133 | −125 | −8 | −16 | 0 | wherein values in Table 2 have been previously stored in the RAM 2.

(c) The sampling direction of the representative reference pixels in the reference data section is not limited to that of the orthogonal main and secondary scanning directions; the direction may be diagonal.

(d) Although five-pixel line-work data is used when the enhancement coefficient component is determined according to the foregoing aspect of the present invention, it may be determined using three-pixel linework data or seven- or greater-pixel line-work data.

(e) When the determination at step S53 is "YES" in FIG. 5, an edge emphasizing operation using Laplace transforms may be added.

III. Data Composing Operation

Figure 10:
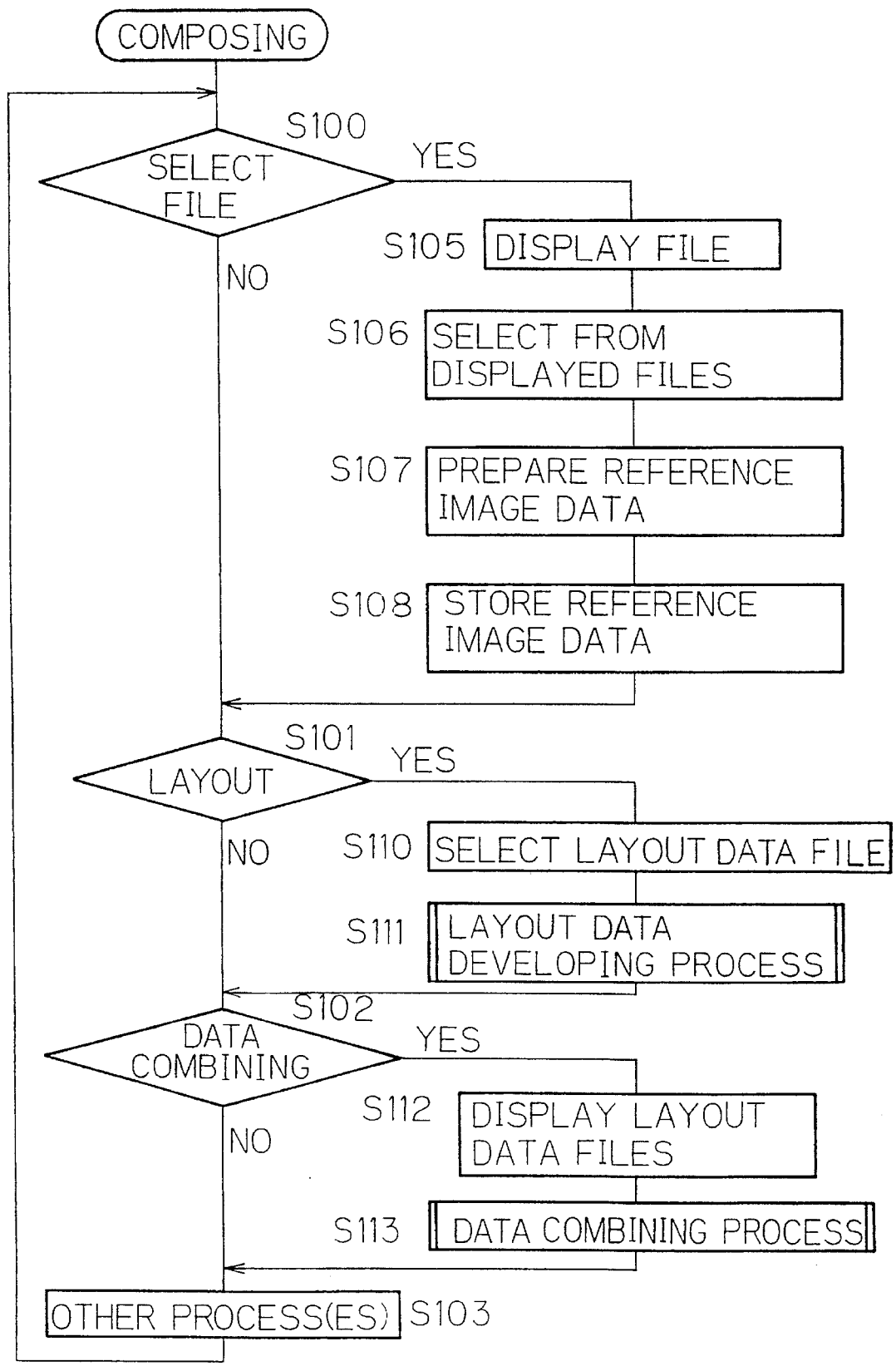
FIG. 10 is a process control flowchart for a stripping and composition operation.

Referring to FIG. 10 showing an data composing operation, it is determined at step S100 whether a command for selecting a file is issued. Then, it is determined at step S101 and at step S102, respectively, whether a command for layout is issued, and whether a command for data combining is issued. Wherein the determinations at steps S100 to 102 are "No", the program proceeds to step S103 to perform another operation, and then returns to step S100.

Wherein the command for selecting a file is issued, the program proceeds from step S100 to step S105. At step S105, a file of multiple-valued line-work data which is to be converted by the line-work converting operation, or a file of picture data input at step S1 is displayed. Then, at step S106, there is a pause until an operator selects a file from the displayed files. When the file is selected, the data is retrieved.

Then, at step S107, a pixel-thinning operation is executed on the multiple-valued line-work data or the picture data retrieved at step S106, whereby thinned-out image data (reference image data) is formed. The reference image data is displayed at the CRT 4, which data is thinned out to be one hundredth. Then, at step S108, the reference image data is stored in the hard disc device again.

Wherein the command for layout is issued, the program proceeds from step S101 to step S110. At step S110, the files of the layout data which have been previously stored are displayed on the CRT, and there is a pause until the operator selects a file. Wherein a file of layout data is newly made, the operator inputs the new file name. Then, at step S111, a layout data developing operation, to be described later, is executed.

Wherein the data combining command is issued, the program proceeds from step S102 to step S112. At step S112, the files of layout data formed by the layout data developing operation at step S111 are displayed. Then, the program proceeds to step S113, in which an image composing operation, to be described shortly, is executed.

Figure 11:
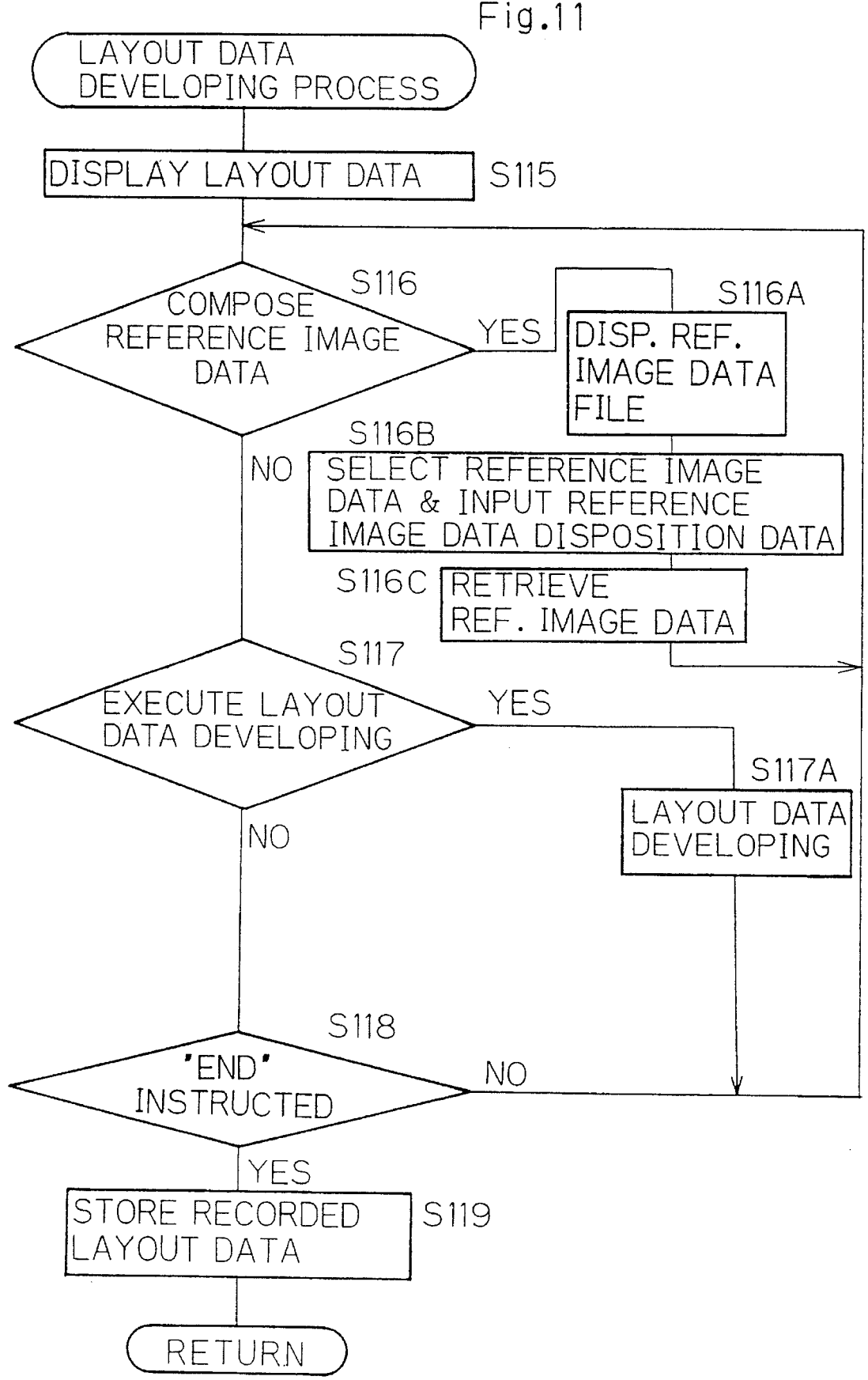
FIG. 11 is a control flowchart for a layout process.

According to the layout data developing operation illustrated in FIG. 11, the layout data is displayed and there is a pause for an operator's instruction at step S115. If the layout data is freshly made, an image of a layout base sheet only is displayed. On the other hand, if already there is composed reference-image data is in the layout data, the reference image data is fetched from the hard disc device and displayed according to a predetermined disposition.

It is determined at step S116 whether a command for composing a file of the reference image data in the layout data is issued. Wherein the command is issued, the program proceeds to S116A. Alternatively, wherein the command is not issued, the program proceeds to step S117. At step S116A, the file of the reference image data stored in the hard disc device is displayed, and there is a pause for an operator's instruction. Then, at step S116b, the file of the reference image data to be composed is selected by the operator and the disposition data, which can be a change in disposition, or magnification or reduction, or rotation of the reference image data, is input by the operator. Then, at step S116c, the selected reference image data is fetched and its reference image is displayed on the CRT according to the disposition data. Thereafter the program returns to step S116.

It is determined at step S117 whether a command for executing the layout data developing is issued. Wherein the command is issued, the program proceeds to S117A. Meanwhile, wherein the command is not issued, the program proceeds to step S118. At step S117A, layout data is developed according to the disposition data and selected reference image data. Then, the program returns to step S116.

It is determined at step S118 whether a command for completing the layout data developing routine is issued. Wherein the command is not issued, the program returns to step S116 and wherein it is issued, the program proceeds to step S119.

At step S119, the thus stored layout data is stored in the hard disc device.

Data Combining Operation

Figure 12:
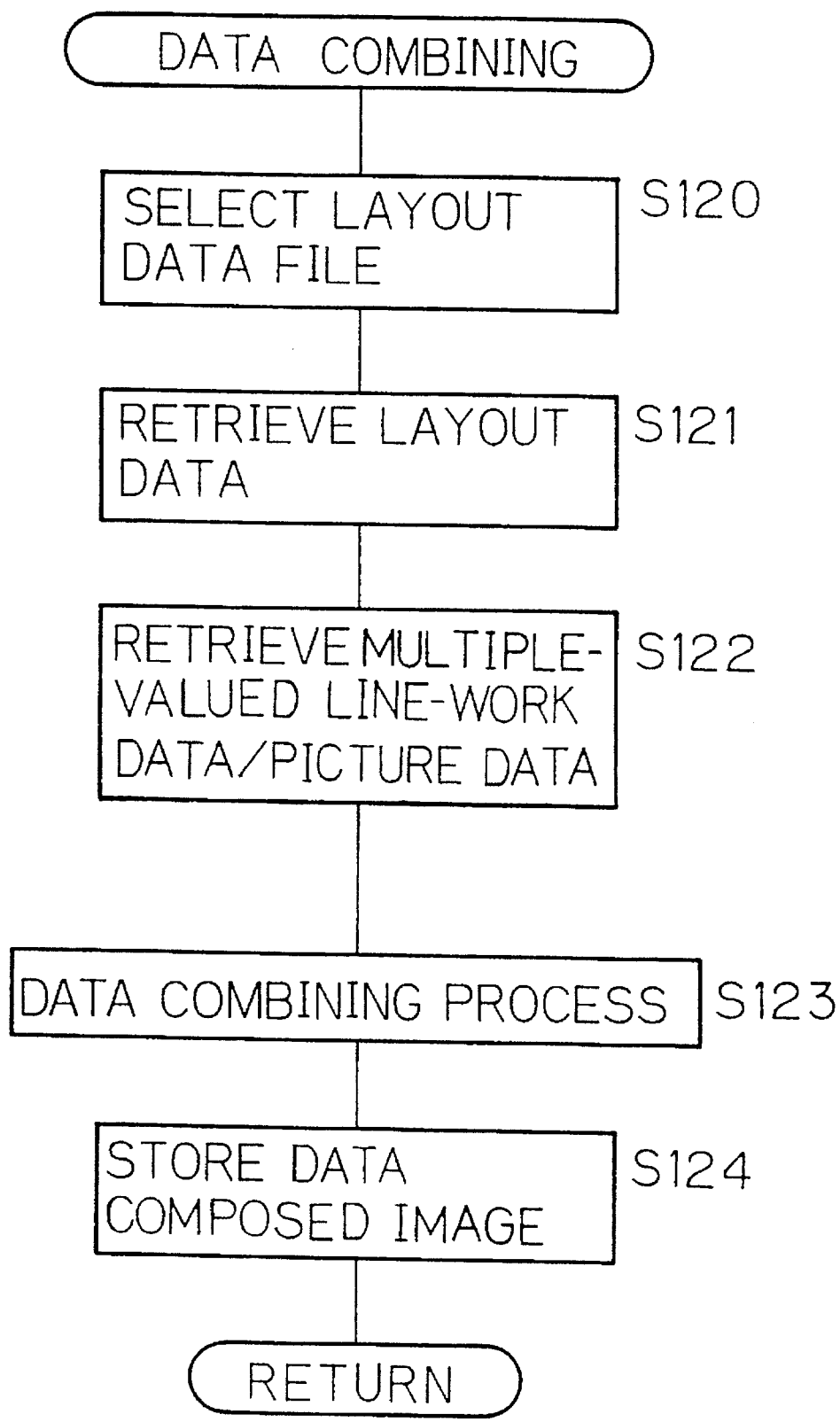
FIG. 12 is a process control flowchart for an image combining operation.

According to the image composing operation shown in FIG. 12, at step S120, there is a pause until the operator selects the file of the layout data. When it is selected, the layout data corresponding to the selected file is fetched at step S121. Then, at step S122, the multiple-valued line-work data and picture data corresponding to the layout data are fetched. Then, at step S123, the multiple-valued line-work data and the picture data fetched according to the layout data are combined. The thus obtained composed image data is stored in the hard disc device at step S124.

IV. O-G Converting Operation

The thus formed multiple-valued image data is raster-format image data for offset. Then, the image data is converted to image data for gravure engraving (gravure data) through O-G conversion.

Figure 13:
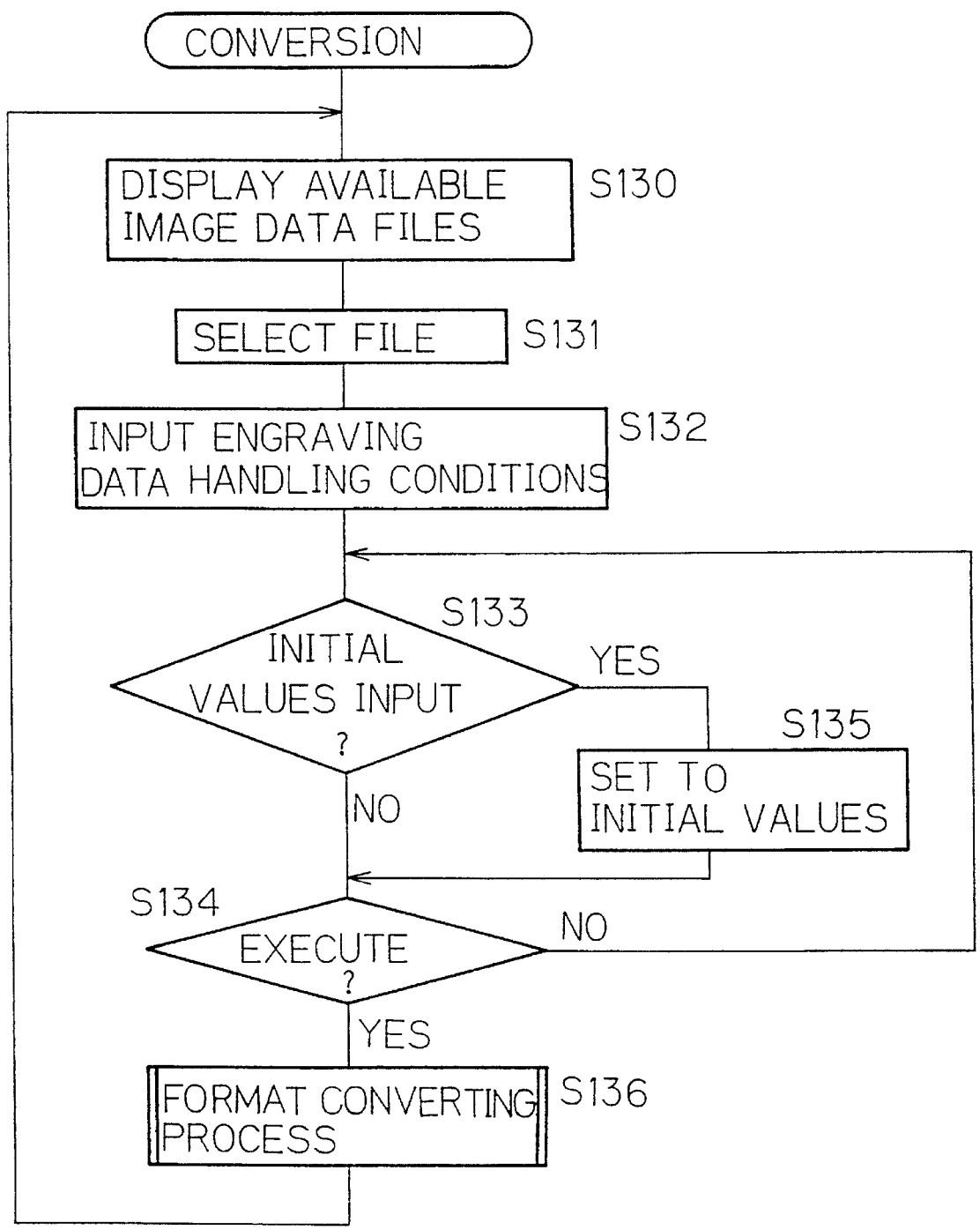
FIGS. 13–16 are process control flowcharts for an offset/gravure (O-G) image data format conversion operation.

Referring to FIG. 13, at step S130, each file of composed image data stored in the hard disc is read and displayed on the CRT display. At step S131, there is a pause until the operator selects the file, and the selected file name is stored. At step S132, a condition input operation is performed. According to the condition input operation, it is selected whether formed gravure data is output to an external storage medium or directly output to the gravure engraving machine 11, or concentration (the number of cell lines) or the like of the gravure data to be formed is set. After the condition input operation, the program proceeds to step S133.

Then, it is determined at step S133 whether initial values of position information of the image data and gravure data used in interpolation are manually input. Then, it is determined at step S134 whether the key for executing the data conversion is pressed. Wherein the initial value is manually input, the program proceeds from step S133 to step S135. At step S135, the initial value input by the operator is set as the position information of the image data and the gravure data. Wherein the aforementioned key is pressed, the program proceeds to step S136, wherein the format converting operation is carried out.

Figure 14:
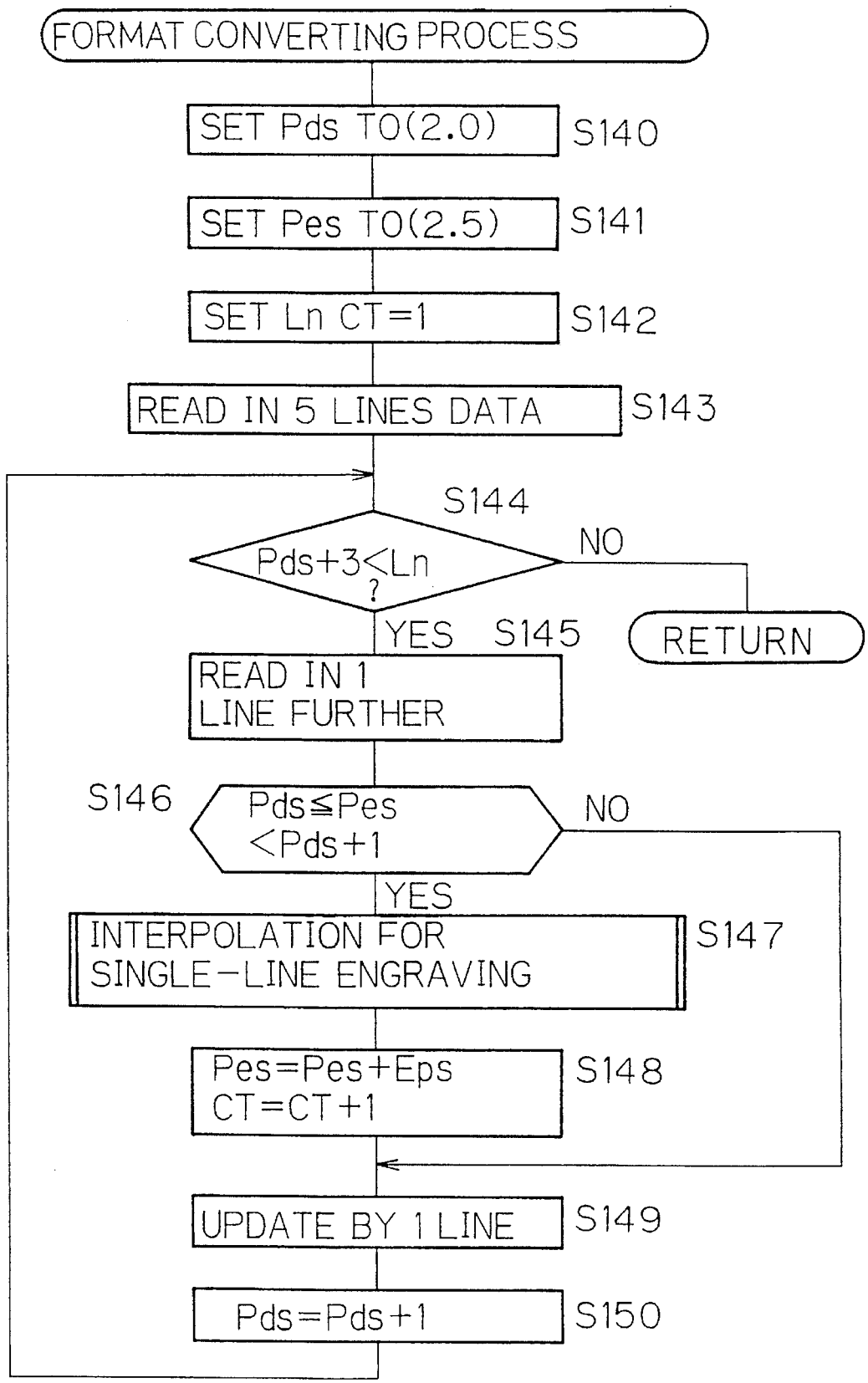

Referring to FIG. 14, illustrating the format converting operation, first, at step S140, an initial value of a variable Pds is set. The variable Pds specifies image data of a plurality of lines (6 lines) to be processed which run parallel in the secondary scanning direction (horizontal direction in FIG. 31). In this example, the variable Pds is the third line among 6 lines to be processed and the initial value is set to "2.0" when automatically set. Wherein the initial value is manually input at steps S133 and S135, the initial value is set to the input value. Then, at step S141, an initial value of a variable Pes virtually showing a position of the gravure data in the secondary scanning direction is set. At this point, the initial value is set to "2.5" when automatically set, and it is set to the input value at step S135 when manually set. Herein, the gravure pixels corresponding to the gravure data to be formed are referred to as virtual gravure pixels. Then, at step S142, a variable Ln showing the number of all lines of the image data in the secondary scanning direction is set. The data Ln is written in a disc storing the image data, together with the image data. Reference numbers 0 to Ln-1 are allotted to the lines. Furthermore, at step S142, a variable CT is set to an initial value "1". The variable CT expresses the line number of the gravure data to be formed thereafter in the secondary scanning direction.

Then, at step S143, image data of five lines is read from the hard disc device and data of the lines is stored in the corresponding line memories LM1 to LM5. The line numbers of the image data stored in the line memories LM1 to LM5 are (Pds−2) to (Pds+2). Then, it is determined at step S144 whether (Pds+3) is less than the number Ln of all lines of the image data in the secondary scanning direction. More specifically, it is determined whether the image data of three lines or more is higher than the line shown by, for example the variable Pds in FIG. 31. Wherein it is not, since the image data is recognized as data at a border of the image, the interpolation is completed.

Wherein the determination at step S144 is "Yes", the program proceeds to step S145. At step S145, image data (line number=Pds+3) of one line in the secondary scanning direction is newly read and stored in the line memory LM6. Then, at step S146, it is determined whether a position of the virtual gravure pixel shown by the variable Pes in the secondary scanning direction is between the line of image data designated by the variable Pds and the next line. Wherein the virtual gravure pixel is positioned between adjacent lines of the image data, the program proceeds to step S147. At step S147, the interpolation is carried out in order to form gravure data of one line. Then, when the gravure data of one line is formed, the program proceeds to step S148, wherein center pitch value Eps (pitch between lines) of the gravure pixels in the secondary scanning direction is added to the variable Pes, and the variable CT is incremented (+1). Then, the program proceeds to step S149. Meanwhile, if the determination at step S146 is "No", that is, if a virtual gravure pixel is not positioned between adjacent lines of the image data, the program skips step S147 and step S148 and proceeds from step S146 to step S149. At step S149, the contents of the buffer memory 5 are updated by one line. More specifically, the image data of lines stored in the line memories LM2 to LM6 is stored over again in the line memories LM1 to LM5 for storing the lines one line previous. Then, the program proceeds to step S150, in which the variable Pds is incremented (+1) and then, the program returns to step S144.

Thus, the gravure data is formed while the image data is updated one line at a time.

Figure 15:
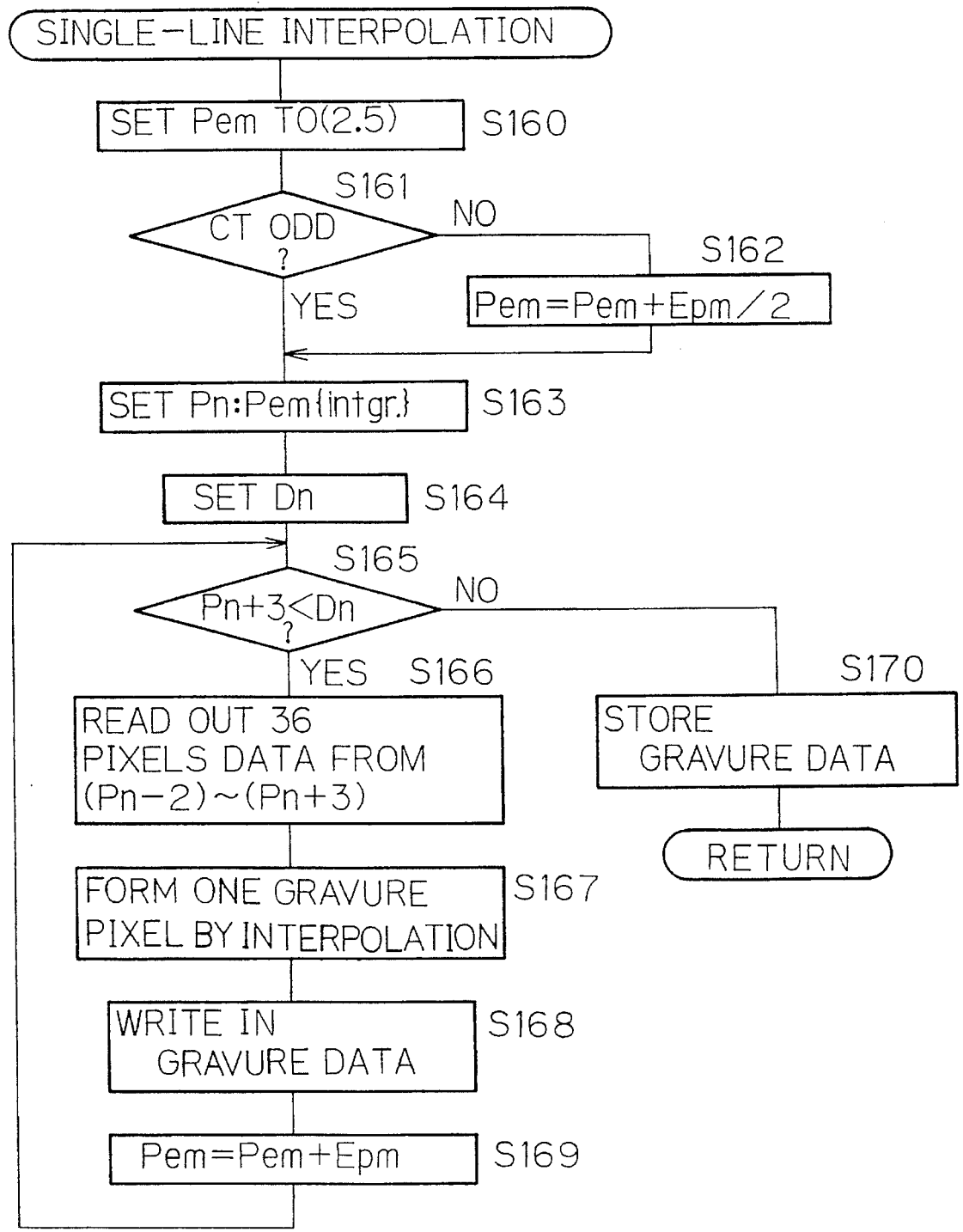

Next, interpolation of the gravure data of one line at step S147 will be described according to the flowchart of FIG. 15.

At step S160, an initial value of a variable Pem showing a position of the virtual gravure pixel in the main scanning direction is set. In this example, the initial value of the variable Pem is set to "2.5" when automatically set, and it is set to the initial value input at step S135 when manually set. Then, it is determined at step S161 whether the variable CT is an odd number. Wherein it is, the program proceeds directly to step S163, and wherein it is not, the program proceeds to step S163 through step S162. At step S162, half of the center pitch value Epm of the gravure pixels in the main scanning direction is added to the variable Pem. By this operation, the gravure data is disposed in staggered format, more specifically, disposition of the gravure data of the even number lines in the secondary scanning direction is shifted in the main scanning direction by half of the center pitch value Epm.

Then, at step S163, a variable Pn, indicating an address of the line memory, is set. The variable Pn specifies the image data of the plurality of lines (six lines) to be processed which run parallel, and the integer portion of the variable Pem becomes Pn as follows;

$$Pn=(int)\ Pem$$

wherein variable Pn expresses the third line of the six lines to be processed. Then, at step S164, a variable Dn showing the number of image data of one line, i.e., the number of data in the main scanning direction is set. The value of the variable Dn has been written previously in the hard disc device.

Then, it is determined at step S165 whether (Pn+3) is less than the number Dn of the image data of one line. More specifically, it is determined whether the image data of three lines or more is higher than the line shown by the variable Pn. Wherein it is, the program proceeds to step S166. At step S166, 36 image data in its entirety stored in the addresses (Pn−2) to (Pn+3) is read for the six lines of the line memories LM1 to LM6. Then, at step S167, interpolation ks performed using 36 pixels of image data, whereby one gravure pixel of gravure data is formed. At step S168, gravure data obtained at step S167 is written once in the line memory. Then, at step S169, the center pitch value Epm of the gravure pixels in the main scanning direction is added to the variable Pem and then, the program returns to step S165. Herein, the center pitch value Epm expresses pixel pitch on each line in the main scanning direction, and is not the pitch of pixels of adjacent lines.

Operations at step S165 to S169 are repeated, whereby the gravure data of one line is formed. When the gravure data of one line is formed, the determination at step S165 is "No" and then the program proceeds to step S170. At step S165, the gravure data is output from the line memory to the hard disc device 8, or to the gravure engraving machine 11.

Figure 16:
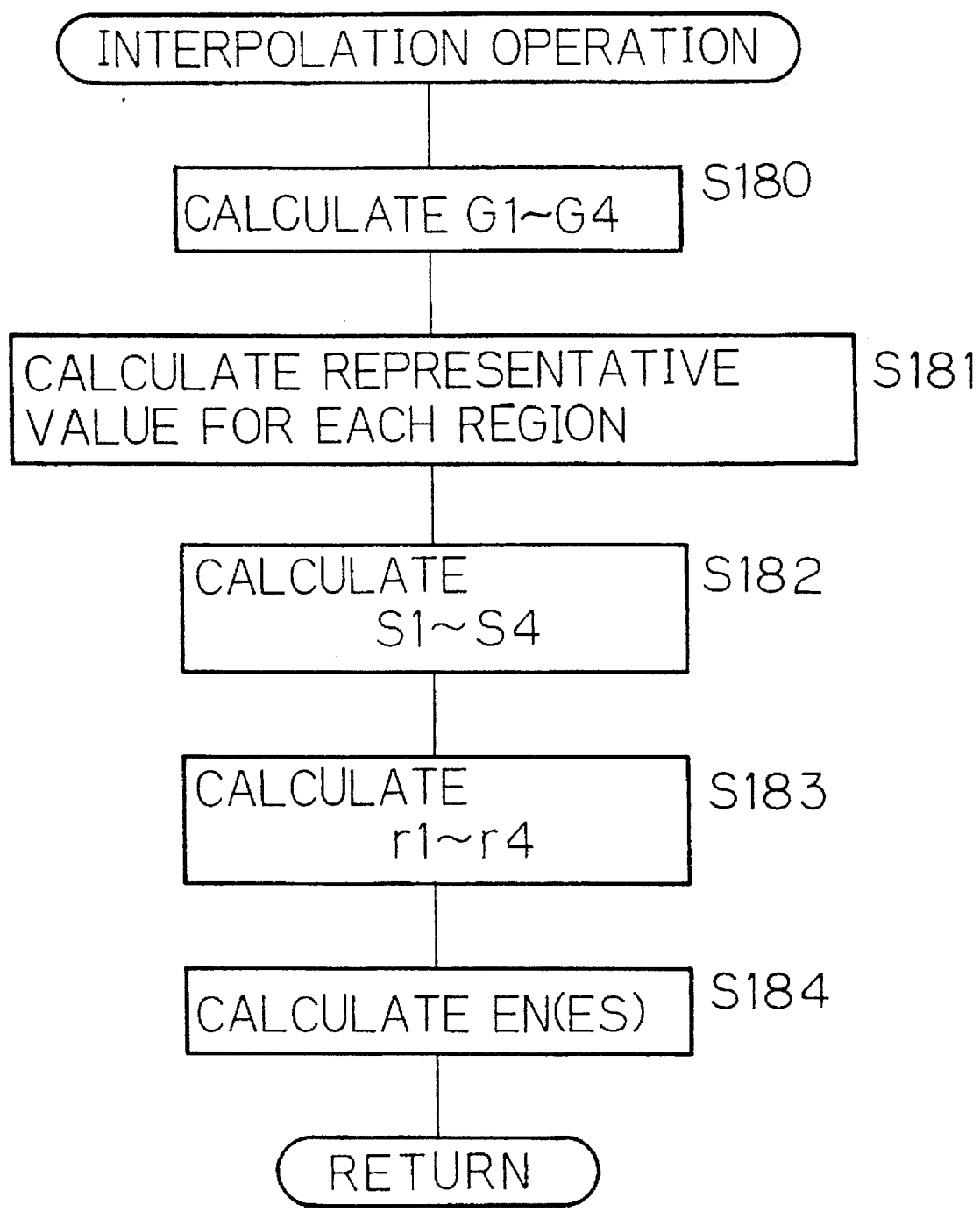

Next, interpolation for forming one gravure pixel of gravure data using 36 pixels of image data will be described according to the flowchart shown of FIG. 16.

Figure 31:
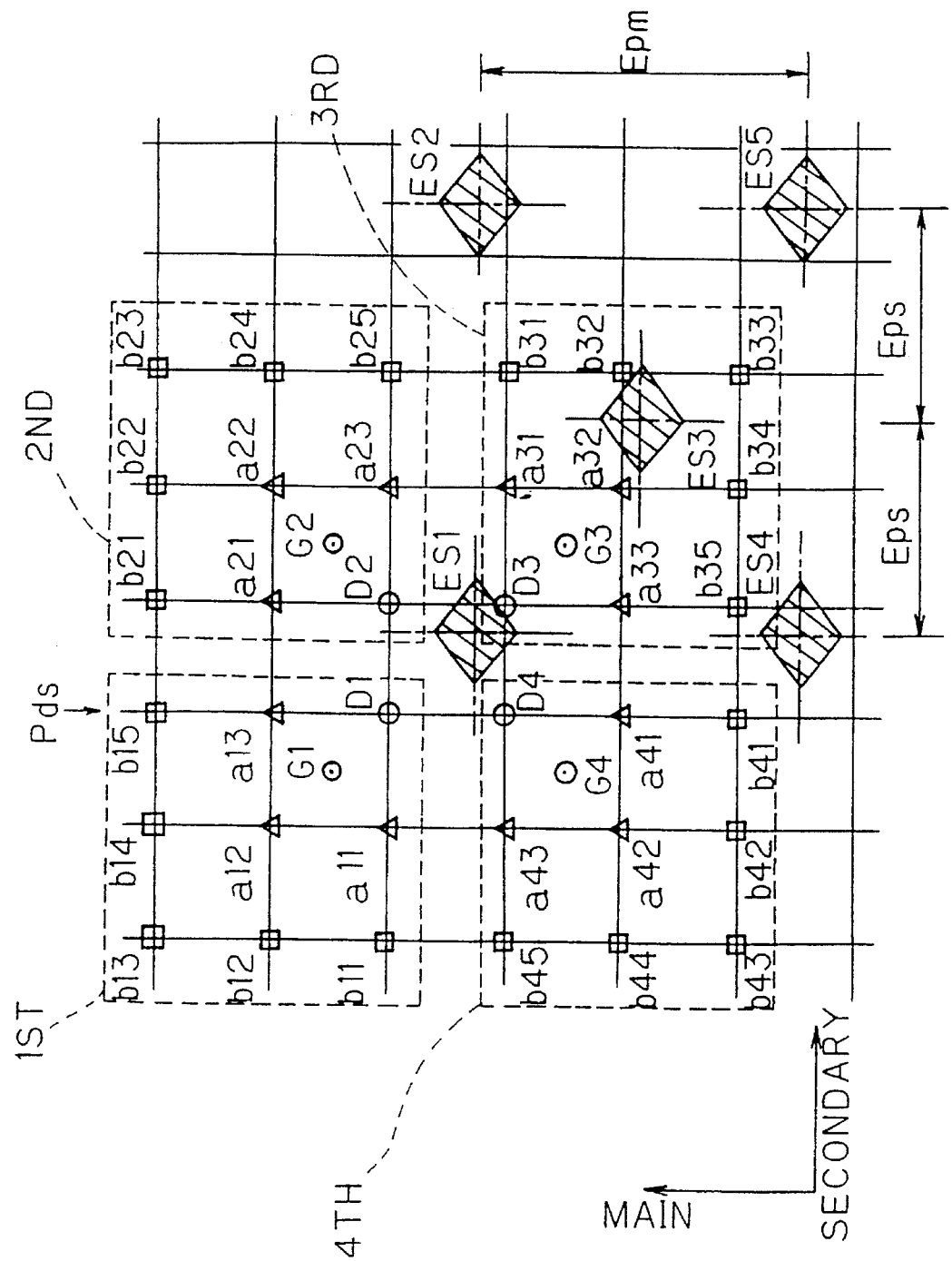
FIG. 31 is a view showing virtual pixels in a gravure printing-screen equivalent stagger format superimposed on a raster of picture data equivalent half-tone pixels.

In the said interpolation, at step S180, positions of center of gravity G1 to G4 in first to fourth regions to which the 36 image data is divided, are calculated. The positions G1 to G4 are positions of center of gravity as the sum of pixel-weight 2 values WD, Wa and Wb, to be described later, and the first to fourth regions are divided as shown in FIG. 31. Each region includes one image data designated by reference D which is nearest the virtual gravure pixel ES1, three image data designated by reference a which are positioned on the outer peripheral side thereof, and five image data designated by reference b which are farthest from the virtual gravure pixel ES1. Then, at step S181, representative values Tn1 to Tn4 of the said regions are calculated according to the following equations.

$$Tn1=WD \times D1+Wa \times (a11+a12+a13)+Wb \times (b11+b12+b13+b14+b15)$$

$$Tn2=WD \times D2+Wa \times (a21+a22+a23)+Wb \times (b21+b22+b23+b24+b25)$$

$$Tn3=WD \times D3+Wa \times (a31+a32+a33)+Wb \times (b31+b32+b33+b34+b35)$$

$$Tn4=WD \times D4+Wa \times (a41+a42+a43)+Wb \times (b41+b42+b43+b44+b45)$$

wherein WD, Wa and Wb are pixel-weight values for weighting image data. In this example, each pixel-weight value is set so as to satisfy the following equation.

$$WD \times 1+Wa \times 3+Wb \times 5=1$$

Figure 32:
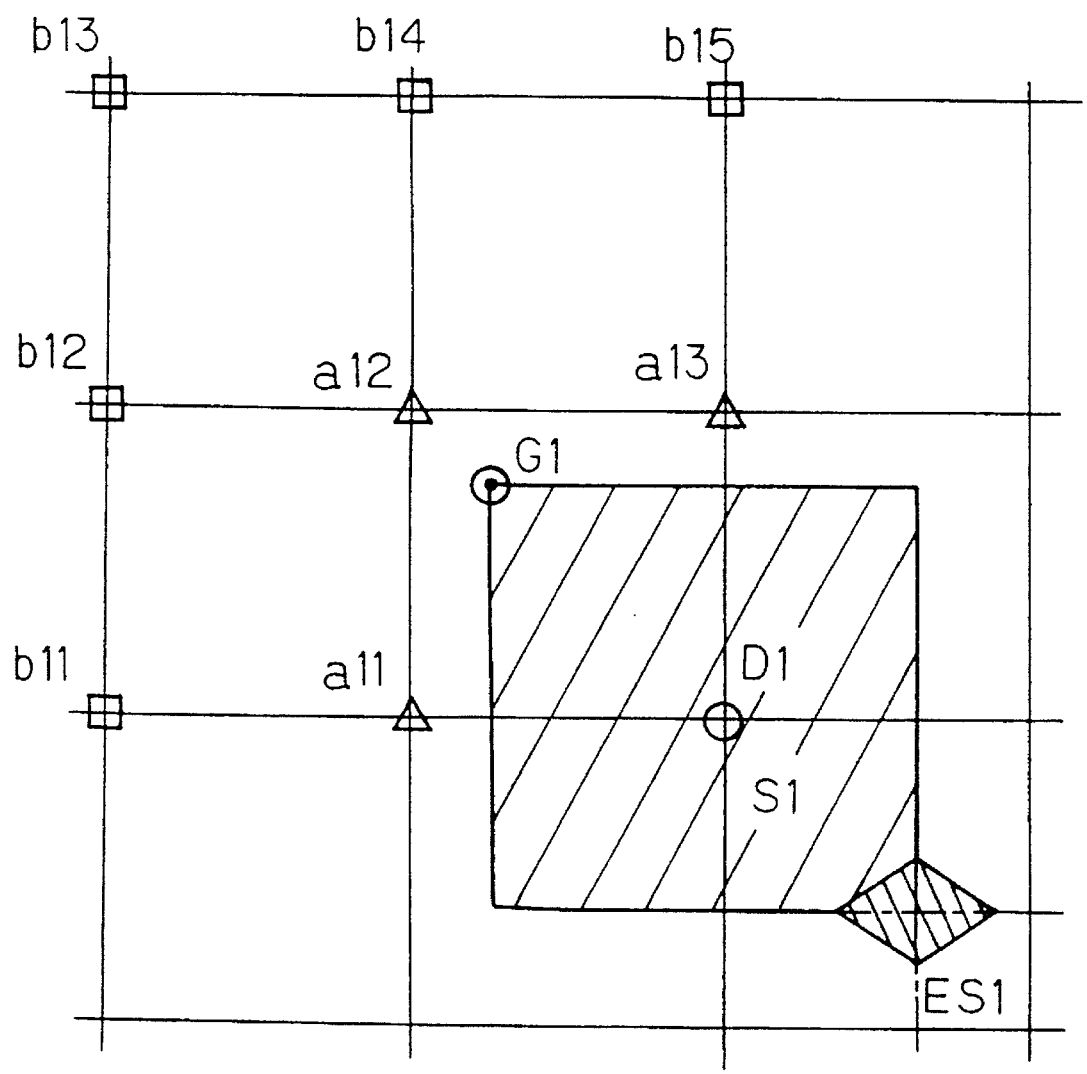
FIG. 32 illustrates a quadrilateral defined for determining engraving cell data in an operation weighing tone values of picture data equivalent half-tone pixels proximal to a target virtual pixel.

Then, at step S182, areas S1, S2, S3 and S4 of rectangles (referring to FIG. 32) whose diagonal vertices are the positions of centers of gravity G1 to G4 in the regions and the center of virtual gravure pixel ES1, respectively, are calculated. Then, at step S183, respective area ratios are calculated according to the following equations.

$$r1=S1/(S1+S2+S3+S4)$$

$$r2=S2/(S1+S2+S3+S4)$$

$$r3=S3/(S1+S2+S3+S4)$$

$$r4=S4/(S1+S2+S3+S4)$$

Then, at step S184, the final tonal value EN of a pixel of gravure data is calculated according to the above data as follows.

$$EN=Tn1 \times r3+Tn2 \times r4+Tn3 \times r1+Tn4 \times r2$$

The integer portion of the thus obtained value EN becomes the gravure data or the virtual pixel ES1.

Figure 33:
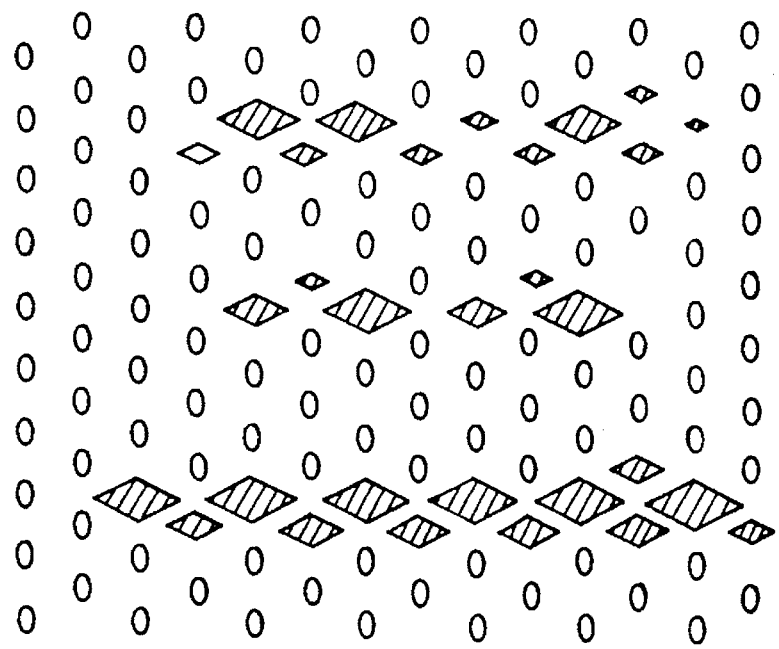
FIG. 33 is an enlarged schematic illustration of a gravure printing screen engraved according to data developed by conventional four-point interpolation.
Figure 34:
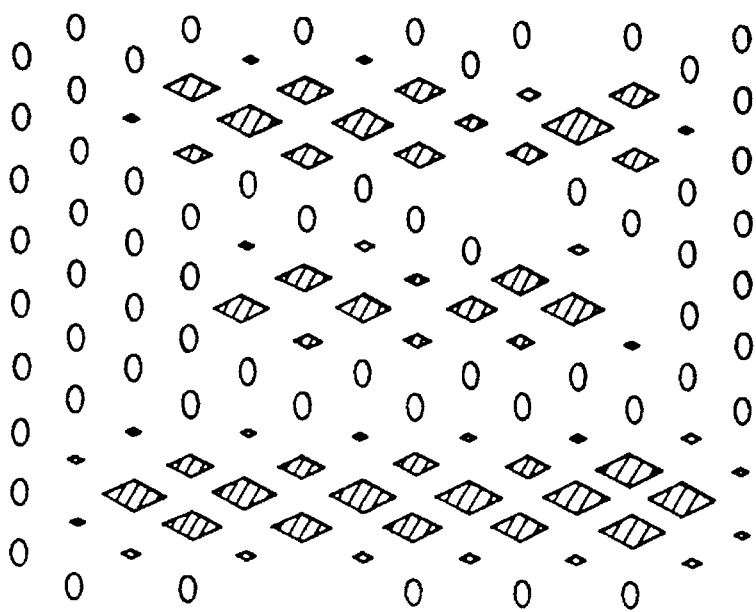
FIG. 34 is an enlarged schematic illustration of a gravure printing screen engraved according to data developed by an image data conversion processor according to the present invention.

FIGS. 33 and 34 illustrate a case where the image data is converted to the gravure data with regard to the Japanese character "三" by a four-point conventional interpolating method, for example, as disclosed in Japanese Patent Publication No. 33060/1980, as well as a case wherein the same image data conversion is performed by the 36-point interpolating method according to the present invention.

According to the conventional method as illustrated in FIG. 33, horizontal lines in "三" are large and expressed by a lesser number of cells, in this case, the printed line edges are notched and the character is unsightly. Additionally, since the degree of difference between high-concentration cells and a low-concentration cells is large, the top line of "三" can look broken in an extreme case. Meanwhile, according to the example shown in FIG. 34, the horizontal lines of "三" are represented by somewhat small cells and very small cells by comparison with the conventional method. In addition, the number of cells is greater. Therefore, the edge of the line diminishes appropriately and the character looks better. In addition, since the difference in concentration between cells is less than the conventional method, the horizontal line looks unbroken.

According to this aspect of the present invention, since all image data is used in performing the interpolation, reproducibility of data for offset printing is improved and problems such as width of fine line varying with position, or shifting of line position can be prevented. Furthermore, since the interpolation is performed while varying with distance the weight of pixels near the virtual gravure pixel and the weight of pixels away from it, the degree of dimness of the obtained engraving data can be controlled.

According to this aspect of the present invention, 36 data are divided into the first to fourth regions and a position of center of gravity and a representative value of each region is calculated once, and then the gravure data is formed. Therefore, compared with a case wherein the interpolation is performed at one time using 36 image data which are not divided into regions based upon relative weighting and separation distance, the gravure data can be formed with the same degree of precision as with the foregoing example in a short time. Meanwhile, wherein the position of the image data pixel and the position of the virtual gravure pixel overlap, since distance between the overlapping data is "0" according to the method for performing the interpolation using 36 data at one time, it becomes necessary to perform another operation in this case. However, according to this aspect of the present invention, since the interpolation is performed by dividing regions and calculating their centers of gravity, the position of the virtual gravure pixel does not overlap with the center of gravity, such that the distance cannot become "0", simplifying the operation.

[Modifications of the O-G Converting Operation]

(a) Although one gravure data is formed using 36 image data according to the above embodiment of the present invention, the number of image data to be referred to is not limited to the above number. Although the number varies with a concentration ratio of the image data to the gravure data, in a case of the concentration ratio in the foregoing embodiment, picture quality after data conversion can be prevented from being degraded by using 12 or more pixel data. An example of the number of data to be used in interpolation is shown in Table 3. The rhombic space filter will be described later.

TABLE 3

| No. | Square Space Filter | Rhombic Space Filter |
|---|---|---|
| 1 | 16 | 12 |
| 2 | 36 | 24 |
| 3 | 64 | 40 |
| 4 | 100 | 60 |
| 5 | 144 | 84 |
| . | . | . |
| . | . | . |
| . | . | . |
| n | $(2n + 2)^2$ | $\Sigma 4(i - 1)$ |

(b) Although the configuration of the space filter is square in the above embodiment of the present invention, since the configuration of cells to be engraved in gravure engraving is rhombic, if the configuration of the space filter is a rhombus, the printed image appear sharper on the whole.

If the configuration of the space filer takes the form of rhombus, 24 data such as D1–D4, a11–a13, a21–a23, a31–a33, a41–a43, b11, b115, b21, b25, b31, b35, b41 and b45 are selected from the 36 data shown in FIG. 31 and the operation is performed in the same manner as in the above embodiment. In addition, the weighted value for each of the data in this case preferably satisfies the following equation.

$$WD \times 1 + Wa \times 3 + Wb \times 2 = 1$$

(c) The number of image data used in the space filter may be automatically determined corresponding to concentration of the image data as shown in the following Table 4. in the Table 4, density of the engraving data formed after interpolation is set to 150 to 200 L/I.

TABLE 4

| Concentration of Image Data (dpi) | | Square Space Filter | Rhombic Space Filter |
|---|---|---|---|
| 300 | or less | 16 | 12 |
| 300 | 500 | 36 | 24 |
| 500 | 700 | 64 | 40 |
| 700 | 900 | 100 | 60 |
| 900 | 1100 | 144 | 84 |
| 1100 | 1300 | 196 | 112 |
| 1300 | 1500 | 256 | 144 |
| 1500 | 1700 | 324 | 180 |
| 1700 | 1900 | 400 | 220 |
| 1900 | 2000 | 484 | 264 | wherein concentration of gravure data formed after interpolation is limited to 150 to 200 L/I.

(d) in a case wherein the region of the space filter is enlarged, the pixel-weight value and the representative value of each region is calculated according to the following equations.

If it is assumed that the weight of i-th data from the center of the virtual gravure pixel is Wi, each pixel weight value is as follows:

Equation 12

$$\Sigma W_i \times (2i-1) = 1 \tag{12}$$

and the representative value is as follows:
Equation 13

$$Tn1 = \Sigma\ W_i \times (\Sigma\ d_{ij}) \tag{13}$$

where $d_{ij}$ expresses j-th data on its i-th lap from the center of the virtual gravure pixel. Thus, the position of the center of gravity is calculated according to the weight of data on each lap, and then area factors r1 to r4 are calculated.

In this case, even if the concentration of the image data used in interpolation varies, an optimal data converting operation can be performed by varying the range or configuration of the space filter.

(g) Although the engraving data is formed from the image data composed of pixels disposed in the latticed raster format, it is enough if the original data can be converted to pixels disposed in lattice. For example, vector data or run-length data can be applied to the present invention by performing raster conversion.

(h) Although the representative values Tn1 to Tn4 are calculated using the three pixel-weight values WD, Wa and Wb which satisfy a specific relation with the image data in each region at step S181 in the above-described embodiment of the present invention, pixel-weight values, for example W1 to W9, may be individually allotted to each of the image data in the region. However, the sum total of the pixel-weight values W1 to W9 should be "1", and accordingly, equations for calculating the representative values Tn1 to Tn4 would vary. For example, the equation for the representative value Tn1 would be as follows.

$$Tn1 = W1 \times D1 + W2 \times a11 + W3 \times a12 + W4 \times a13 + W5 \times b11 + W6 \times b12 + W7 \times b13 + W8 \times b14 + W9 \times b15$$

What is claimed is:

1. An image data conversion processor for use with a gravure electromechanical engraving system, comprising:

a central processing unit to which an input device is connectable, said central processing unit having an internal memory;

at least one data storage device connected to said central processing unit, for storing image data scanned in a raster format of pixels from a subject image; wherein said central processing unit in response to conditional data input via an input device defines a staggered format of virtual gravure cell positions corresponding to real gravure printing cells different from the raster format of pixels of the image data, said central processing unit correlates the staggered format of virtual gravure cell positions with the raster format of pixels of the image data, said central processing unit defines interpolation regions of the raster format of pixels of the image data for correlating each of the virtual gravure cell positions with the interpolation regions, and said central processing unit determines pixel-weighting values of the interpolation regions and interpolates gravure printing cell data from the pixel-weighting values of the interpolation regions in correlation with each virtual gravure cell position, the gravure printing cell data determining actual volume of gravure printing cells engraved by a gravure engraving machine into a gravure printing medium in correspondence with the subject image; and an input/output port connected to said central processing unit for receiving the scanned image data into storage by said data storage device, and for transmitting as an output to a gravure engraving machine the gravure printing cell data interpolated by said central processing unit.

2. An image data conversion processor according to claim 1, said line-work data converter comprising:

a dual-value into multiple-value converter for selecting from said dual-valued pixels a block of conversion pixels according to a predetermined aperture corresponding to one multiple-valued pixel of said multiple-valued line-work data, for evaluating a tonal value for said one multiple-valued pixel by enumerating dual-value line-work pixels of maximum image tonal density among said block of conversion pixels.

3. An image data conversion processor according to claim 2, said line-work data converter further comprising:

a data enhancer for enhancing said multiple-valued line-work data in the conversion of said dual-valued line-work data into said multiple-valued line-work data, for improving fidelity of gravure reproduction of fine lines.

4. An image data conversion processor according to claim 3, said data enhancer comprising:

a first selector for selecting representative reference pixels from said dual-valued pixels, for evaluating an enhancement coefficient, wherein said enhancement coefficient is determined by solving predetermined equations applied to the values of said representative pixels; and a developing unit for developing enhanced multiple-valued line-work data by adding said tonal value for said one multiple-valued pixel to said enhancement coefficient.

5. An image data conversion processor according to claim 2, said dual-value into multiple-value converter comprising a first determining unit for determining a size of said aperture according to a relation between the pixel concentration of said dual-value line-work data and the pixel concentration of said multiple-valued line-work data prior to the selection of said block of conversion pixels.

6. An image data conversion processor according to claim 3, said data enhancer comprising:

a first selector for selecting representative reference pixels from said dual-valued pixels, for evaluating an enhancement coefficient, wherein said enhancement coefficient is determined by referring to experimentally derived relational data relating enhancement coefficient value to the values of the selected representative reference pixels; and a developing unit for developing enhanced multiple-valued line-work data by adding said tonal value for said one multiple-valued pixel to said enhancement coefficient.

7. An image data conversion processor according to claim 4, said data enhancer further comprising:

a limiting unit for limiting individual-pixel enhanced tonal value in said enhanced multiple-valued line-work data to be within operator-determinable zero and maximum values, wherein said limiting unit changes the enhanced tonal value of an individual pixel in said enhanced multiple-valued line-work data to said maximum value if said enhanced tonal value exceeds said maximum value; and said limiting unit changes the enhanced tonal value of an individual pixel in said enhanced multiple-valued line-work data to zero if said enhanced tonal value is negative.

8. An image data conversion processor according to claim 6, said data enhancer further comprising:

a limiting unit for limiting individual-pixel enhanced tonal value in said enhanced multiple-valued line-work data to be within operator-determinable zero and maximum values, wherein said limiting unit changes the enhanced tonal value of an individual pixel in said enhanced multiple-valued line-work data to said maximum value if said enhanced tonal value exceeds said maximum value; and said limiting unit changes the enhanced tonal value of an individual pixel in said enhanced multiple-valued line-work data to zero if said enhanced tonal value is negative.

9. An image data conversion processor according to claim 4, said representative reference pixels comprising a main line of pixels aligned in a predetermined direction; and a secondary line of pixels aligned in a direction perpendicular to said predetermined direction, wherein the main and secondary lines of pixels include one pixel centrally located in said block of conversion pixels, and respective enhancement coefficient components are calculated from said main and secondary lines of pixels, for determining said enhancement coefficient.

10. An image data conversion processor according to claim 6, said representative reference pixels comprising a main line of pixels aligned in a predetermined direction; and a secondary line of pixels aligned in a direction perpendicular to said predetermined direction, wherein the main and secondary lines of pixels include one pixel centrally located in said block of conversion pixels, and respective enhancement coefficient components are calculated from said main and secondary lines of pixels, for determining said enhancement coefficient.

11. An image data conversion processor for use with a gravure electromechanical engraving system, comprising:

a central processing unit to which an input device is connectable, said central processing unit having an internal memory;

at least one data storage device connected to said central processing unit, for storing image data scanned in a raster format of pixels from a subject image, the image data including half-tone separation picture data containing multiple-valued pixels corresponding to continuous-tone portions of the subject image, and the image data including line-work data containing dual-valued pixels corresponding to line-work/text portions of the subject image, the line-work data having a higher pixel concentration than a pixel concentration of the picture data; wherein said central processing unit converts the dual-valued line-work data into multiple-valued line-work data comprising multiple-valued pixels in concentration equivalent to the pixel concentration of the picture data, said central processing unit composes image data by combining the picture data with the multiple-valued line-work data according to predetermined layout data, said central processing unit interpolates gravure printing cell data by correlation with the composed image data, the gravure printing cell data determining actual volume of gravure printing cells engraved by a gravure engraving machine into a gravure printing medium in correspondence with the subject image; and an input/output port connected to said central processing unit for receiving the scanned image data into storage by said engraving machine the gravure printing cell data interpolated by said central processing unit.

12. An image data conversion processor according to claim 1, said data composer comprising:

a layout data processing unit for operator-directed developing of the layout data, wherein said layout data define a pattern for assembling picture data and multiple-valued line-work data selected from said storage; and a data combining unit for developing said composed image data by combining said picture data and said multiple-valued line-work data according to said layout data.

13. An image data conversion processor according to claim 12, said layout data processing unit comprising:

a reducing unit for reducing said picture data and said multiple-valued line-work data to be suitable for CRT display by deriving pixel-thinned reference picture data from said picture data, and pixel-thinned reference multiple-valued line-work data from said multiple-valued line-work data;

a second determining unit for determining said pattern for combining said picture data and said multiple-valued line-work data by operator manipulation through said CRT of said reference picture data and said reference multiple-valued line-work data, wherein said layout data processing unit develops said layout data according to said pattern.

14. An image data conversion processor according to claim 1, said format converter comprising:

a selector for selecting a block of interpolation pixels corresponding to one virtual gravure pixel for engraving a gravure cell from multiple-valued pixels of image data composed by said multiple-valued line-work data and said picture data; and an evaluator for evaluating a tonal value of said virtual gravure pixel by summing tonal values of said interpolation pixels, wherein said interpolation pixels are weighted by predetermined pixel weights according to location relative to said virtual gravure pixel.

15. An image data conversion processor according to claim 14, said format converter further comprising:

a dividing unit for dividing said interpolation pixels into a plurality of regions;

means for independently weighting values of the interpolation pixels in each region; and means for summing the tonal values of the interpolation pixels in each region as partial sums;

said format converter summing the tonal values of said interpolation pixels from said partial sums.

16. An image data conversion processor according to claim 15, said selector for selecting a block of interpolation pixels comprising:

interpolation pixel number predetermining means for predetermining a number of pixels for selection by said means for selecting a block of interpolation pixels according to a pixel concentration of said multiple-valued line-work data and said picture data.

17. An image data conversion processor according to claim 15, said selector for selecting a block of interpolation pixels comprising:

interpolation pixel number predetermining means for predetermining a number of pixels for selection by said means for selecting a block of interpolation pixels according to pixel concentration of said gravure data.

18. An image data conversion processor according to claim 15, said means for dividing said interpolation pixels into a plurality of regions comprising a square filter, wherein said format converter divides said interpolation pixels by said square filter into square regions having boundaries orthogonally parallel with ordering directions of said interpolation pixels as determined by a raster format of said image data composed by said multiple-valued line-work data and said picture data.

19. An image data conversion processor according to claim 15, said means for dividing said interpolation pixels into a plurality of regions comprising a rhombic filter, wherein said format converter divides said interpolation pixels by said rhombic filter into rhomboid regions having boundaries on a bias with ordering directions of said interpolation pixels as determined by a raster format of said image data composed by said multiple-valued line-work data and said picture data.

20. An image data conversion processor for use with a gravure electromechanical engraving system, comprising:

a central processing unit to which an input device is connectable, said central processing unit having an internal memory;

at least one data storage device connected to said central processing unit, for storing image data scanned in a raster format of pixels from a subject image; the image data including half-tone separation picture data containing multiple-valued pixels corresponding to continuous-tone portions of the subject image, and the image data including line-work data containing dual-valued pixels corresponding to line-work/text portions of the subject image, the line-work data having a higher pixel concentration than a pixel concentration of the picture data; wherein said central processing unit converts the dual-valued line-work data into multiple-valued line-work data comprising multiple-valued pixels in a concentration equivalent to the pixel concentration of the picture data, said central processing unit develops raster format composed image data by combining the picture data with the multiple-valued line-work data according to predetermined layout data, said central processing unit interpolates gravure printing cell data by correlation with the composed image data, the gravure printing cell data determining actual volume of gravure printing cells engraved by a gravure engraving machine into a gravure printing medium in correspondence with the subject image; and an input/output port connected to said central processing unit for receiving the scanned image data into storage by said data storage device, and for transmitting as an output to a gravure engraving machine the gravure printing cell data interpolated by said central processing unit.

* * * * *